United States Patent
Held et al.

(10) Patent No.: US 10,809,158 B2
(45) Date of Patent: Oct. 20, 2020

(54) APPARATUS AND METHOD FOR CHECKING TYRES

(71) Applicant: PIRELLI TYRE S.P.A., Milan (IT)

(72) Inventors: Alessandro Held, Milan (IT); Vincenzo Boffa, Milan (IT)

(73) Assignee: PIRELLI TYRE S.P.A., Milan (IT)

(*) Notice: Subject to any disclaimer, the term of this patent is extended or adjusted under 35 U.S.C. 154(b) by 104 days.

(21) Appl. No.: 16/064,448

(22) PCT Filed: Dec. 28, 2016

(86) PCT No.: PCT/IB2016/058052
§ 371 (c)(1),
(2) Date: Jun. 20, 2018

(87) PCT Pub. No.: WO2017/115300
PCT Pub. Date: Jul. 6, 2017

(65) Prior Publication Data
US 2018/0372590 A1  Dec. 27, 2018

(30) Foreign Application Priority Data
Dec. 28, 2015 (IT) .............................. UB2015A9374

(51) Int. Cl.
*G01M 17/02* (2006.01)
*G01N 21/95* (2006.01)
(Continued)

(52) U.S. Cl.
CPC .......... *G01M 17/027* (2013.01); *G01B 11/24* (2013.01); *G01N 21/9515* (2013.01); *G01N 21/954* (2013.01)

(58) Field of Classification Search
CPC .. G01M 17/02; G01M 17/021; G01M 17/022; G01M 17/027; G01M 17/025;
(Continued)

(56) References Cited

U.S. PATENT DOCUMENTS 3,722,270 A    3/1973  Sperberg
4,506,981 A *  3/1985  Hoff, Jr. .............. G01M 17/027
                                                    356/458
(Continued)

FOREIGN PATENT DOCUMENTS

CN    1624420 A    6/2005
CN    101672627 A  3/2010
(Continued)

OTHER PUBLICATIONS

Non-Final Office Action for U.S. Appl. No. 16/066,264, filed Jun. 26, 2018, on behalf of Pirelli Tyre S.P.A, dated Jan. 16, 2019. 8 pages.
(Continued)

*Primary Examiner* — Andre J Allen
(74) *Attorney, Agent, or Firm* — Steinfl & Bruno LLP

(57) ABSTRACT

An apparatus for checking a tyre, having a support, a deformation system, a lighting arrangement, a moving member and a processing unit. The deformation system is configured to form an elastically deformed portion of inner surface and an elastically deformed portion of outer surface on the tyre. The lighting arrangement includes light sources and cameras to illuminate and detect deformed inner and outer surface portions of the tyre, and generate corresponding control signals. The moving member sets the support in relative rotation with respect to the light sources and the deformation system around a rotation axis of the tyre. The processing unit is configured so that while the light sources illuminate the deformed portions of outer and inner surfaces, the deformation system acts and the moving member imparts the relative rotation.

20 Claims, 9 Drawing Sheets

(51) Int. Cl.
*G01B 11/24* (2006.01)
*G01N 21/954* (2006.01)

(58) Field of Classification Search
CPC ...... G01M 17/024; G01M 17/10; G01M 7/08;
G01M 17/0076; G01M 17/013; G01M
17/03; G01M 17/04; G01M 17/06; G01M
17/08; G01M 1/02; G01M 1/045; G01M
1/12; G01M 1/225; G01M 3/40; G01M
5/0091; G01M 7/02; G01M 99/00; G01M
99/002; B60C 23/0494; B60C 2019/004;
B60C 23/0493; B60C 19/00; B60C 23/04;
B60C 23/0498; B60C 23/064; B60C
23/0488; B60C 23/0496; B60C 23/0408;
B60C 23/041; B60C 23/0411; B60C
23/20; B60C 23/0486; B60C 23/06; B60C
11/243; B60C 11/246; B60C 23/061;
B60C 99/00; B60C 11/0083; B60C
13/003; B60C 2009/2038; B60C 23/00;
B60C 23/003; B60C 23/004; B60C 23/02;
B60C 23/0401; B60C 23/0406; B60C
23/0416; B60C 23/0433; B60C 23/0455;
B60C 23/0459; B60C 23/0474; B60C
23/0489; B60C 23/0491; B60C 25/002;
B60C 25/005; B60C 25/007; B60C 29/02;
B60C 3/04; B60C 99/006; B60C 11/0332;
B60C 11/24; B60C 13/001; B60C 13/02;
B60C 15/0036; B60C 17/02; B60C
2009/0071; B60C 2009/2022; B60C
2200/02; B60C 2200/06; B60C 2200/065;
B60C 23/001; B60C 23/007; B60C
23/008; B60C 23/0413; B60C 23/0427;
B60C 23/0447; B60C 23/0454; B60C
23/0457; B60C 23/0462; B60C 23/0467;
B60C 23/0471; B60C 23/0472; B60C
23/0476; B60C 23/0479; B60C 23/0484;
B60C 23/065; B60C 23/066; B60C 23/10;
B60C 25/0548; B60C 25/056; B60C
25/132; B60C 25/138; B60C 25/18; B60C
29/005; B60C 9/005; B60C 9/18; B60C
9/1807; B60C 9/20; B60C 9/28
See application file for complete search history.

(56) References Cited

U.S. PATENT DOCUMENTS

| | | | |
|---|---|---|---|
| 6,327,374 | B1 | 12/2001 | Piironen et al. |
| 6,680,471 | B2 | 1/2004 | Kokubu et al. |
| 6,840,097 | B1 | 1/2005 | Huber et al. |
| 7,187,437 | B2 | 3/2007 | Shaw et al. |
| 7,343,789 | B2* | 3/2008 | Fujisawa ............ G06K 9/2054 73/146 |
| 7,421,108 | B2 | 9/2008 | Kaneko et al. |
| 7,466,430 | B2 | 12/2008 | Braghiroli |
| 7,568,385 | B2 | 8/2009 | Maehner et al. |
| 8,284,393 | B2 | 10/2012 | Takahashi et al. |
| 8,618,924 | B2 | 12/2013 | Fujisawa |
| 8,824,878 | B2 | 9/2014 | Mizukusa et al. |
| 9,097,514 | B2 | 8/2015 | Takahashi et al. |
| 9,175,952 | B2 | 11/2015 | Mizutani et al. |
| 9,239,274 | B2 | 1/2016 | Joly |
| 9,719,944 | B2 | 8/2017 | Boffa et al. |
| 10,488,302 | B2 | 11/2019 | Held et al. |
| 10,605,698 | B2 | 3/2020 | Held et al. |
| 2001/0024279 | A1 | 9/2001 | Kaneko et al. |
| 2004/0212795 | A1 | 10/2004 | Steinbichler et al. |
| 2005/0052637 | A1* | 3/2005 | Shaw ............ G01B 11/162 356/35.5 |
| 2005/0052657 | A1 | 3/2005 | Braghiroli |
| 2005/0264796 | A1 | 12/2005 | Shaw et al. |
| 2007/0093981 | A1 | 4/2007 | Reynolds et al. |
| 2009/0282905 | A1* | 11/2009 | Dengler ............ G01M 17/027 73/146 |
| 2010/0002244 | A1 | 1/2010 | Iino et al. |
| 2010/0013916 | A1 | 1/2010 | Maehner |
| 2011/0018999 | A1 | 1/2011 | Joly et al. |
| 2011/0188731 | A1 | 8/2011 | Sekiguchi |
| 2011/0288814 | A1 | 11/2011 | Mizutani et al. |
| 2012/0134656 | A1 | 5/2012 | Mizukusa et al. |
| 2013/0093879 | A1 | 4/2013 | Bertolotti |
| 2014/0373614 | A1 | 12/2014 | Steinbichler et al. |
| 2015/0226644 | A1 | 8/2015 | Boffa et al. |
| 2016/0084739 | A1 | 3/2016 | Park |
| 2016/0238488 | A1 | 8/2016 | Charlat et al. |
| 2016/0377556 | A1 | 12/2016 | Boffa et al. |
| 2017/0370807 | A1 | 12/2017 | Boffa et al. |
| 2018/0143102 | A1 | 5/2018 | Boffa et al. |
| 2018/0299352 | A1 | 10/2018 | Rose et al. |
| 2018/0299353 | A1 | 10/2018 | Held et al. |
| 2018/0328819 | A1* | 11/2018 | Boffa ............ G01M 17/027 |
| 2018/0364134 | A1* | 12/2018 | Held ............ G01M 17/027 |
| 2018/0372592 | A1 | 12/2018 | Held et al. |
| 2019/0017902 | A1 | 1/2019 | Held et al. |
| 2019/0086293 | A1 | 3/2019 | Held et al. |
| 2019/0318466 | A1 | 10/2019 | Ghidotti Piovan et al. |

FOREIGN PATENT DOCUMENTS

| | | |
|---|---|---|
| CN | 102053042 A | 5/2011 |
| CN | 102203578 A | 9/2011 |
| CN | 102313749 A | 1/2012 |
| CN | 102478527 A | 5/2012 |
| CN | 103038601 A | 4/2013 |
| CN | 203011704 U | 6/2013 |
| DE | 4231578 A1 | 3/1994 |
| EP | 1030173 A1 | 8/2000 |
| EP | 1120640 A1 | 8/2001 |
| EP | 2078955 A1 | 7/2009 |
| EP | 2322899 A1 | 5/2011 |
| JP | 2008203258 A | 9/2008 |
| JP | 2009139268 A | 6/2009 |
| JP | 2010266259 A | 11/2010 |
| JP | 2011038896 A | 2/2011 |
| JP | 5518571 B2 | 6/2014 |
| WO | 01/81886 A2 | 11/2001 |
| WO | 2008/053742 A1 | 5/2008 |
| WO | 2010/024254 A1 | 3/2010 |
| WO | 2017/141094 A1 | 8/2014 |
| WO | 2015/004587 A1 | 1/2015 |
| WO | 2015/044196 A1 | 4/2015 |
| WO | 2015/079370 A1 | 6/2015 |
| WO | 2017/103814 A1 | 6/2017 |
| WO | 2017/103873 A1 | 6/2017 |
| WO | 2017/115290 A1 | 7/2017 |

OTHER PUBLICATIONS

Non-Final Office Action for U.S. Appl. No. 15/780,602, filed May 31, 2018 on behalf of Pirelli Tyre S.P.A dated Sep. 13, 2019. 15 pages.

Notice of Allowance for U.S. Appl. No. 16/066,264, filed Jun. 26, 2018 on behalf of Pirelli Tyre S.P.A dated Aug. 1, 2019. 8 pages.

International Search Report for International Application No. PCT/IB2016/058038 filed Dec. 28, 2016 on behalf of Pirelli Tyre S.P.A, dated May 11, 2017. 3 pages.

Written Opinion for International Application No. PCT/IB2016/058038 filed Dec. 28, 2016 on behalf of Pirelli Tyre S.P.A, dated May 11, 2017. 6 pages.

International Search Report and Written Opinion issued for International Patent Application No. PCT/IB2016/058052, filed Dec. 28, 2016 on behalf of Pirelli Tyre S.P.A, dated Jun. 16, 2017. 13 pages.

International Search Report issued for International Patent Application No. PCT/IB2016/057712, filed Dec. 16, 2016 on behalf of Pirelli Tyre S.P.A, dated Mar. 30, 2017. 4 pages.

(56) References Cited

OTHER PUBLICATIONS

Written Opinion issued for International Patent Application No. PCT/IB2016/057712, filed Dec. 16, 2016 on behalf of Pirelli Tyre S.P.A, dated Mar. 30, 2017. 6 pages.
International Search Report and Written Opinion issued for International Patent Application No. PCT/IB2016/058036, filed Dec. 28, 2016 on behalf of Pirelli Tyre S.P.A, dated Jul. 21, 2017. 12 pages.
EPO Communication pursuant to Article 94(3) EPC for EP Application No. 16836051 filed on behalf of Pirelli Tyre S.P.A dated Jul. 24, 2019 6 pages.
First Office Action for Chinese Application No. 201680081671.2 filed on Dec. 28, 2016 on behalf of Pirelli Tyre S.P.A, dated Sep. 27, 2019. 12 Pages. Chinese Original + English.
International Search Report for PCT/IB2016/057620 filed on Dec. 15, 2016 on behalf of Pirelli Tyre S.P.A, dated Mar. 23, 2017. 3 pages.
Non-Final Office Action for U.S. Appl. No. 15/776,398, filed May 15, 2018 on behalf of Pirelli Tyre S.P.A dated Dec. 19, 2019 10 pages.
Notice of Allowance for U.S. Appl. No. 15/780,602, filed May 31, 2018 on behalf of Pirelli Tyre S.P.A, dated Nov. 20, 2019. 8 Pages.
Written Opinion for PCT/IB2016/057620 filed on Dec. 15, 2016 on behalf of Pirelli Tyre S.P.A, dated Mar. 23, 2017. 6 pages.
EPO Communication Office Action for EP Application No. 16836051 filed on behalf of Pirelli Tyre S.P.A dated Jan. 14, 2020. 4 pages.
First Office Action for Chinese Application No. 201680070465.1 on behalf of Pirelli Tyre S.P.A, dated Dec. 4, 2019. 14 pages., Chinese original + English translation.
First Office Action for Chinese Application No. 201680081202.0 filed on behalf of Pirelli Tyre S.P.A, dated Jan. 7, 2020. 19 pages, Chinese + English translation.
Japanese Office Action for Japanese Application No. 2018532287, dated Jan. 28, 2020. 8 pages.
Non-Final Office Action for U.S. Appl. No. 16/064,982, filed Jun. 21, 2018 on behalf of Pirelli Tyre S.P.A, dated Feb. 11, 2020. 11 pages.
Notice of Allowance for U.S. Appl. No. 15/776,398, filed May 15, 2018 on behalf of Pirelli Tyre S.P.A, dated Apr. 17, 2020 10 pages.
Russian Office Action for Russian Application No. 2018124988/28(039605) filed on behalf of Pirelli Tyre SPA, dated Apr. 17, 2020. 17 pages. (Russian + English Translation).

\* cited by examiner

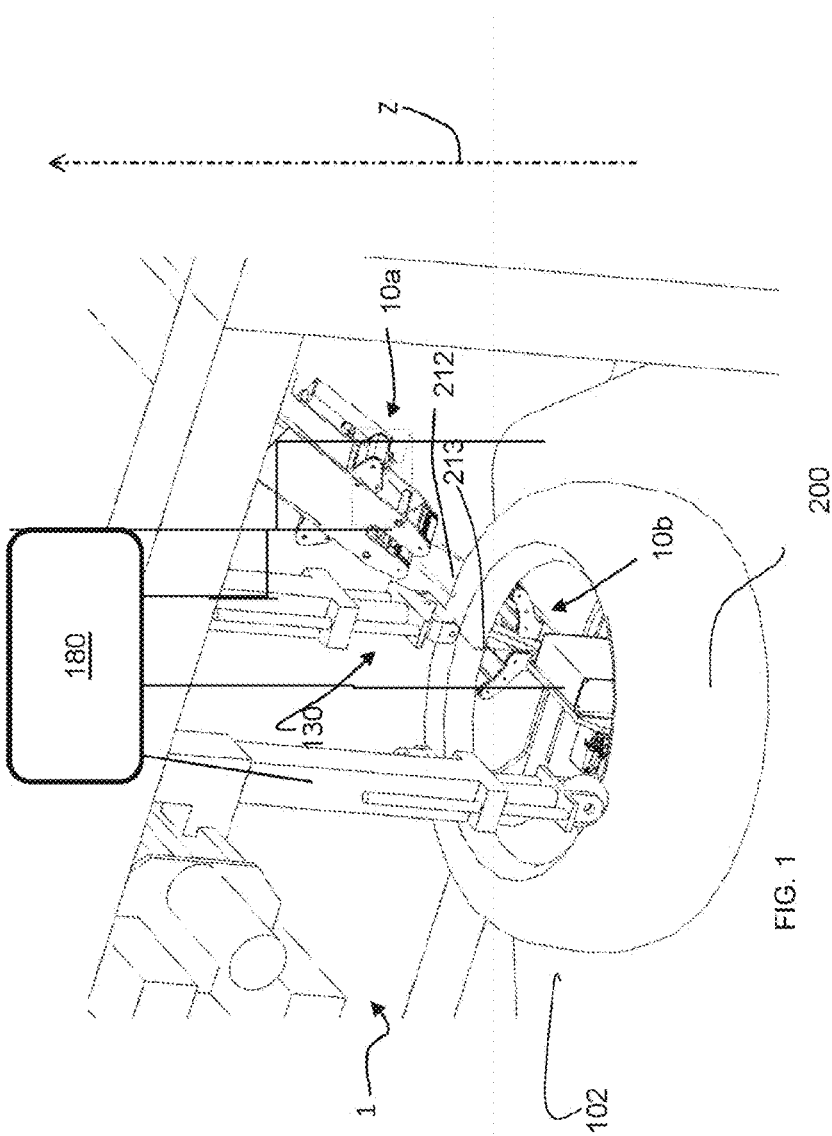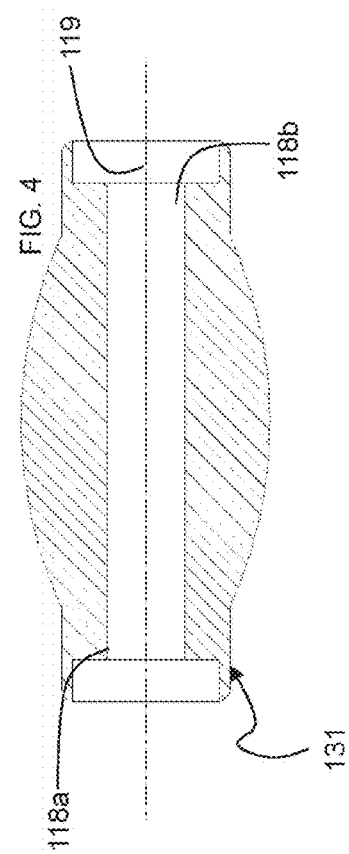

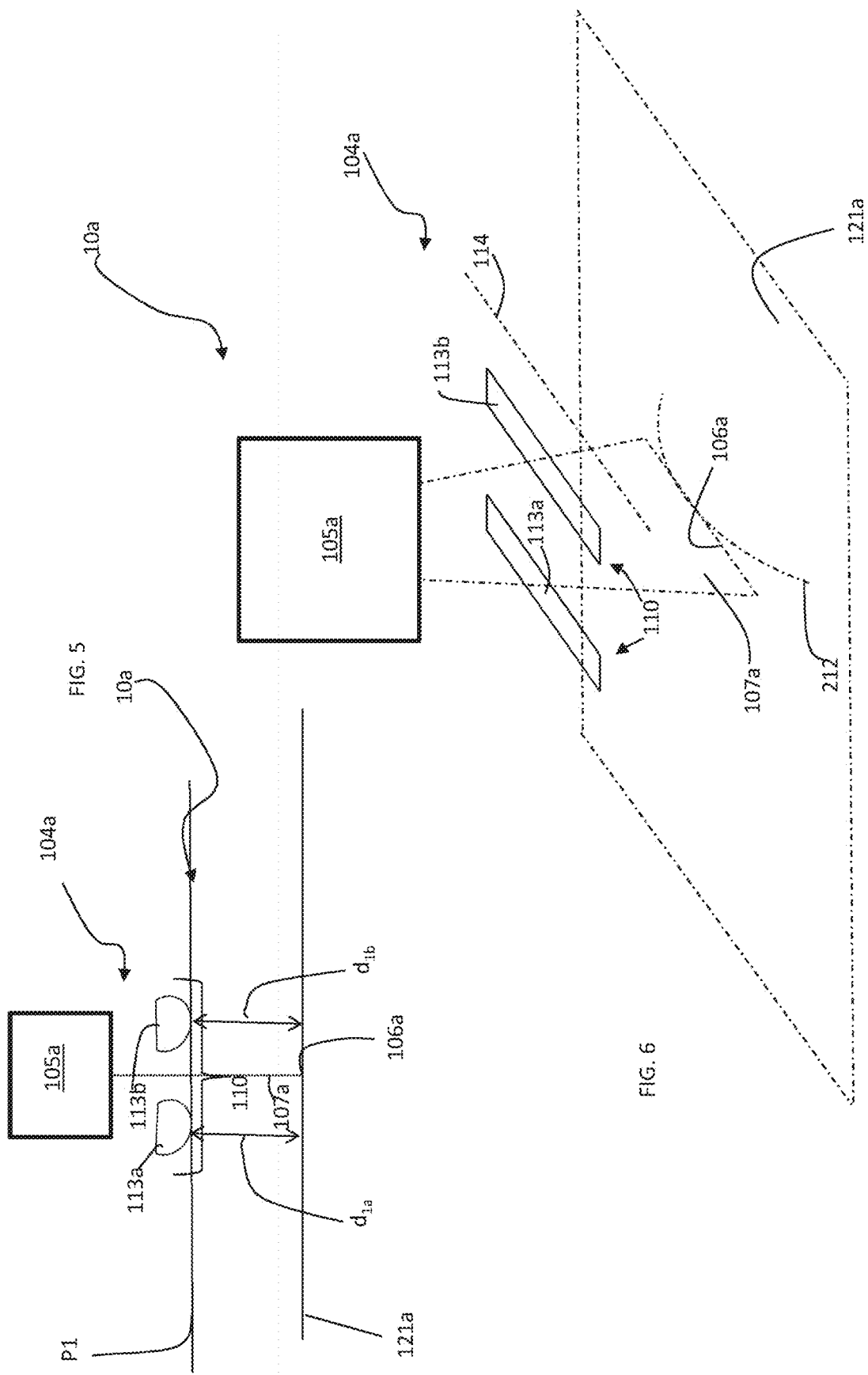

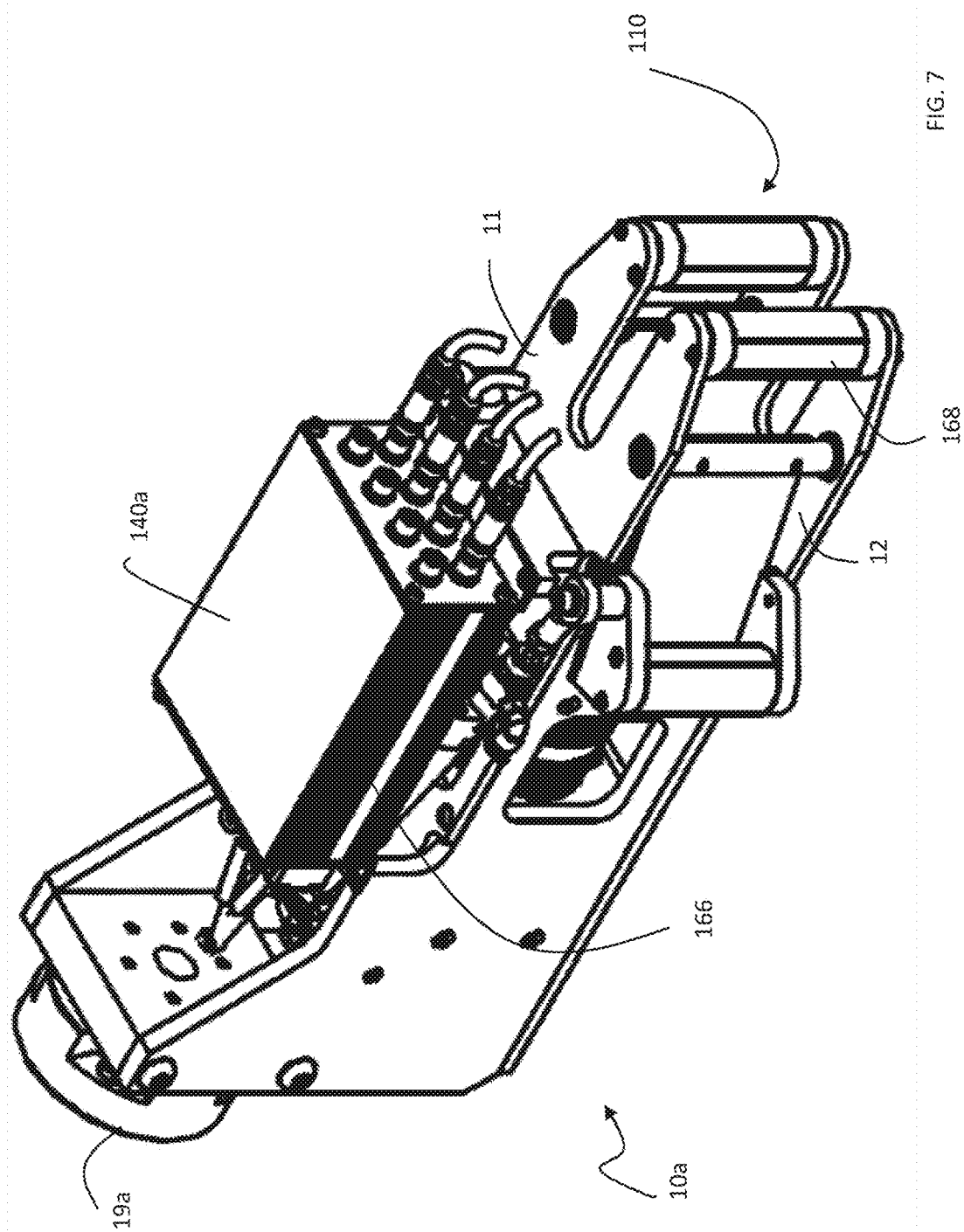

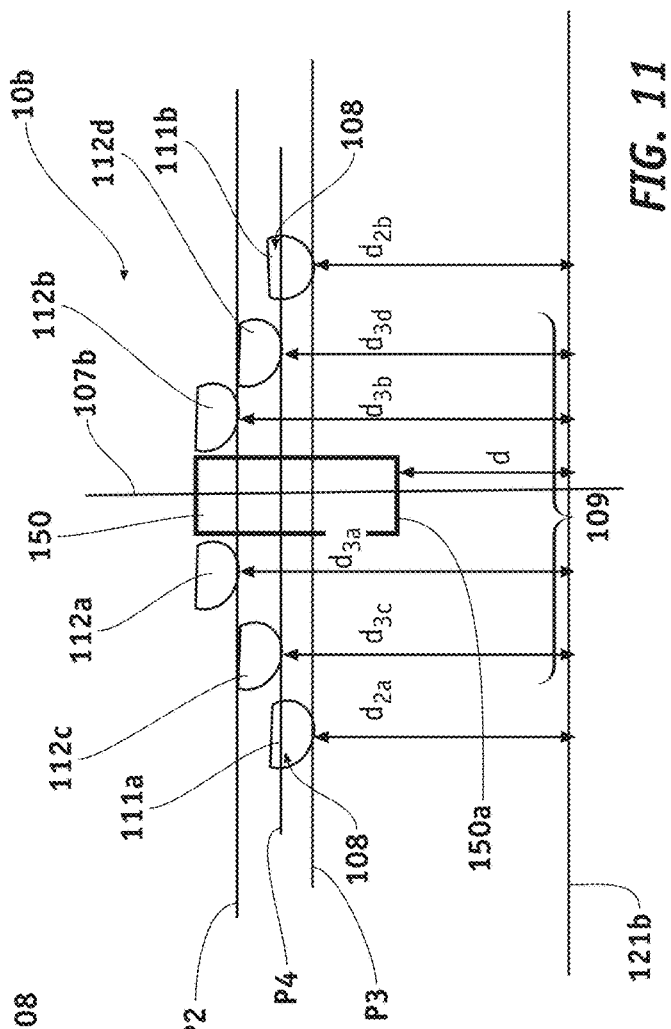
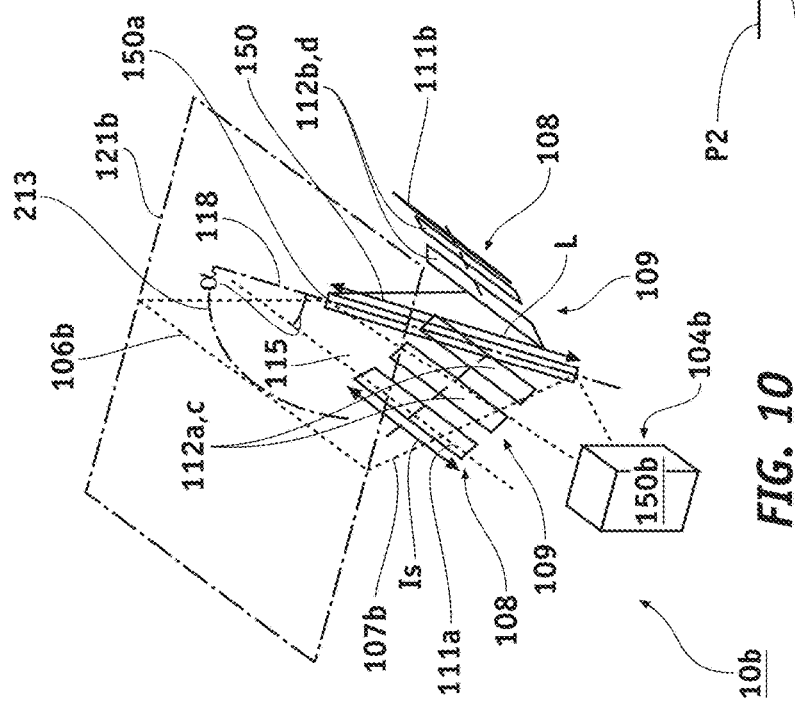

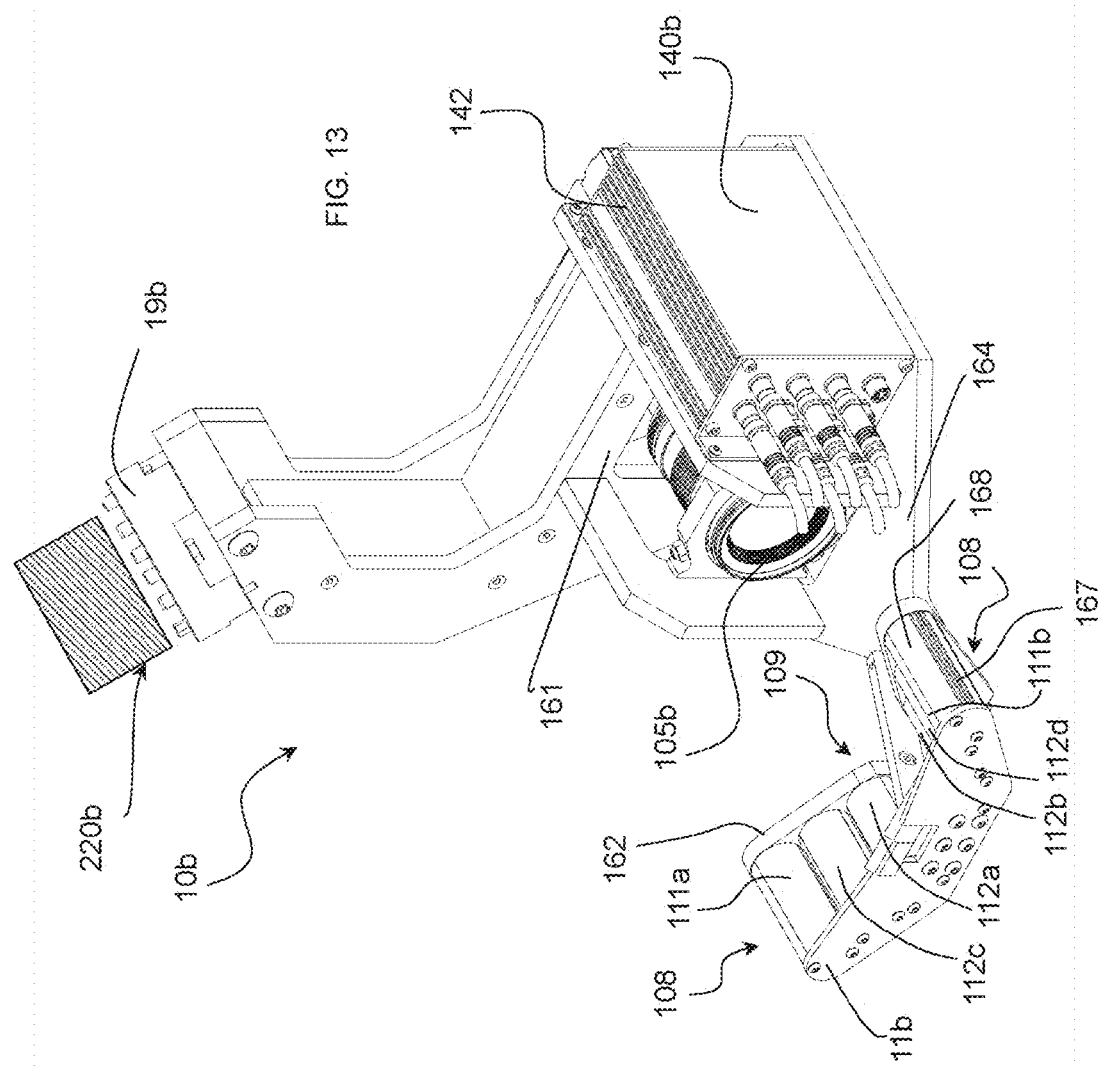

APPARATUS AND METHOD FOR
CHECKING TYRES

CROSS REFERENCE TO RELATED APPLICATIONS

The present application is the U.S. national stage of International Patent Application PCT/IB 2016/058052 filed internationally on Dec. 28, 2016, which, in turn, claims priority to Italian Patent Application No. UB2015A009374 filed on Dec. 28, 2015.

The present invention concerns an apparatus and method for checking tyres, for example in a tyre production line, in particular an apparatus and method for checking for the possible presence of defects on, or close to, the surface of a tyre, more in particular on, or close to, the inner and outer surface of the outer walls of a tyre. Typically, a tyre has a substantially toroidal structure about a rotation axis thereof during operation, and has an axial mid-plane perpendicular to the rotation axis, said plane typically being a plane of (substantial) geometric symmetry, (e.g. ignoring possible minor asymmetries, such as the tread pattern and/or the internal structure). Two portions of the tyre are identified here: the crown and the outer walls. The crown comprises the tread band, the belt and the corresponding portion of carcass structure inside them.

The term "outer wall" is meant to indicate one of the two portions of the tyre facing one another and that extend on opposite sides of the crown up to the beads, i.e. up to the two inner end edges of the tyre, having circular extension substantially perpendicular to the rotation axis; said beads being intended to each couple with a respective mounting rim. Each outer wall thus comprises a corresponding portion of carcass structure and, in a position axially outside of it, a portion made of suitable elastomeric material, generally called 'sidewall'.

Typically, the carcass structure comprises at least one carcass ply having respectively opposite end edges engaged with respective annular reinforcing structures, generally called "bead cores", integrated in the areas identified above with the name beads. In "tubeless" tyres, the carcass ply is entirely coated with a layer of elastomeric material preferably butyl-based, usually called "liner" having excellent characteristics of impermeability to air and extending from one bead to another.

The structure of an outer wall is also meant to entirely include the so-called "shoulder", i.e. the portion of the tyre for joining between the crown and the inner portion of the outer wall (in other words, the two shoulders correspond to the two axially outer circular 'edges' of the tyre). The shoulder has circular extension substantially perpendicular to the rotation axis.

The term "radius of curvature" is meant to indicate the local radius of curvature of the surface of an element of the tyre on any radial section plane, i.e. comprising said rotation axis (the radial section of the tyre typically being unchanged over the entire tyre).

The term "tyre" is meant to indicate the "finished" tyre, i.e. after the moulding and vulcanisation steps following the building step.

The terms outer or inner surface of the tyre, are respectively meant to indicate the surface that remains visible after the coupling of the tyre with its mounting rim and that which is no longer visible after said coupling.

The terms "optical", "light" and similar refer to an electromagnetic radiation used that has at least one portion of the spectrum falling within a widened range of the optical band, and not necessarily falling strictly within the optical band (in other words 400-700 nm), for example such a widened range of the optical band can extend from ultraviolet to infrared (for example wavelengths comprised between about 100 nm and about 1 µm).

In the present application a ray model of light radiation is adopted, i.e. it is presumed that light radiation incident on a point of a surface and generated by a non-pointed light source (in which case there would be a single ray) corresponds to a set of light rays incident on the point and having rectilinear propagation direction that connects each point of the light source with said point of the surface, where each of such rays has an associated fraction of the total light power incident on the point. The terms "light" and "light radiation", if not specified any further, are used interchangeably. The term "directional light radiation" incident at a point of a surface is meant to indicate light radiation for which there is a solid angle having the point as vertex and amplitude less than or equal to $\pi/8$ steradians in which at least 75% of the total light power, preferably at least 90%, more preferably the entire light power falls.

The term "diffused light radiation" is meant to indicate a non-directional light radiation. The term "grazing light radiation" incident at a point of a surface is meant to indicate a light radiation in which at least 75% of the total light power thereof incident on the point of the surface forms an angle of incidence less than or equal to 60° with a plane tangent to the surface at each said point.

The term "image" or synonymously "digital image" is meant to indicate in general a dataset, typically contained in a computer file, in which each coordinate (typically two-dimensional) of a finite set (typically two-dimensional and of the matrix type, i.e. N rows×M columns) of spatial coordinates (each typically corresponding to a pixel) is associated with a corresponding set of numeric values (which can be representative of magnitudes of a different type). For example, in monochromatic images (like those on the 'grayscale') such as set of values coincides with a single value in a finite scale (typically with 256 levels or tones), such a value for example being representative of the level of luminosity (or intensity) of the respective spatial coordinate when visualised, whereas in colour images the set of values represents the level of luminosity of multiple colours, or channels, typically the primary colours (for example in the RGB colour model red, green and blue, whereas in the CMYK colour model cyan, magenta, yellow and black). The term 'image' does not necessarily imply the actual visualisation thereof.

Every reference to a specific "digital image" (for example to a two-dimensional digital image initially acquired on the tyre) more generally covers any digital image that can be obtained through one or more digital processing operations of said specific digital image (like for example filtering, equalisation, "thresholding", morphological transformations—"opening", etc.,—gradient calculations, "smoothing", etc.).

The term "two-dimensional image" is meant to indicate a digital image each pixel of which has an associated piece of information representative of the reflectivity/diffusivity and/or of the colour of the surface, such as the images detected by common digital cameras.

The term "linear surface portion" is meant to indicate a surface portion having one dimension much larger than the other dimension perpendicular to it, typically greater by at least two orders of magnitude. The smaller dimension of the linear surface portion is typically smaller than or equal to 0.1 mm.

The term "linear image" is meant to indicate a digital image having a much greater number of columns of pixels than the number of rows, typically greater by at least two orders of magnitude. Typically, the number of rows is between 1 and 4 and the number of columns is more than 1000. The term "rows" and "columns" are used conventionally and are interchangeable.

The term "cycle time" within a production line comprising at least one work station, preferably a plurality of work stations, and inserted in a plant for producing tyres is meant to indicate, under normal operating conditions, the maximum transit time for a tyre being manufactured to pass through a work station in which at least one portion of a component of the tyre itself is built. For example, the cycle time can be comprised between about 20 and about 120 seconds.

In processes for producing and building tyres for vehicle wheels it is suitable to carry out quality controls on the products made, with the purpose of avoiding tyres that are defective or in any case outside of the design specifications from being able to be released onto the market, and/or of progressively adjusting the apparatuses and machinery used, so as to improve and optimise the performance of the operations carried out in the production process.

Such quality controls include for example those carried out by human operators who spend a predetermined time period, for example comprised between 30 s and 60 s, carrying out a visual and tactile examination of the tyre; if, in light of his/her experience and sensitivity, the operator suspects that the tyre does not meet certain quality standards, the tyre itself is subjected to further checks, through a more detailed human check and/or suitable apparatuses, in order to more deeply evaluate possible structural and/or quality deficiencies.

WO 2015/004587 to the same Applicant shows a method and relative apparatus, for checking tyres in a production line, comprising: providing a tyre to be checked; elastically deforming a portion of outer wall of the tyre through a compression force on an outer contact surface of the portion of outer wall, the compression force having an axial direction and going towards the plane of the middle line; illuminating an inner and/or outer surface of the portion of outer wall and detecting an image of the surface illuminated; generating a control signal representative of the image detected; and analysing the control signal in order to detect the possible presence of defects on the portion of outer wall.

In the field of the checking of tyres, the Applicant has set itself the problem of analysing the surface, inner and/or outer, of the tyre, through optical image acquisition, for example digital, thereof and their subsequent processing, for example in order to detect the possible presence of visible defects on the surface, minimising the checking by human operators. The defects sought can for example be irregularities on the surface of a tyre (unvulcanised compound, alterations in shape, etc.), structural unevenness, cuts, presence of foreign bodies on the surface, etc. Among structural unevenness defects, so-called "carcass cuts" are particularly critical, which are rare but potentially very dangerous defects, generated in the interface region between two portions of the tyre having different chemical-physical characteristics (for example different compounds). Such defects are in the form of small cuts (typically extending longitudinally, i.e. they follow the circular extension of the tyre) characterised by perfectly matching edges (between which there is no removal or lack of material), this being a characteristic that makes them particularly difficult to identify. The carcass cuts can also involve structures of the carcass arranged close to the surface of the tyre, for example close to the inner surface, under the layer of liner typically present. In this case typically the liner itself is involved in the cuts, also having a laceration at the carcass cuts and thus making it possible to identify it through optical inspection.

The Applicant has also observed that in order for the check to be able to be used "on line" within a tyre production plant, it is necessary for the check to be carried out in shorter time periods and with low costs.

Therefore, the method and/or the apparatus for checking tyres through acquisition and analysis of images thereof to highlight possible defects is preferable which takes a time period for such a check that stays within the aforementioned limited "cycle time" period and at the same time ensures an accurate verification of the presence of defects in the tyre itself, at reasonably low cost.

The Applicant has therefore observed that a way of completing a global check of the tyre in a short time is to look for different defects "in parallel", i.e. during the same time period: in this case it could be advantageous to provide more than one device, each for identifying one defect. However, the provision of more than one device in parallel increases the complexity of the tyre production line in its part relative to the checking. Furthermore, the provision of "illuminations" of portions of tyre by light sources present in many devices could cause undesired interference between an illumination carried out through one light source and an illumination carried out through a distinct light source.

The Applicant has, however, observed that the provision of two devices that analyse an inner portion and an outer portion, respectively, of the tyre minimises the possibility of mutual interaction between the devices themselves, both in terms of interaction of the illuminations, and in terms of physical interaction in the movement of the devices.

The Applicant has also noted that the illumination, for the same light source, is influenced by the geometry of the object illuminated: on non-flat surfaces, like those of the outer wall of the tyre, it is difficult to obtain homogeneous illumination over the entire surface and it is necessary to find a compromise situation between the different areas, in order to minimise the overexposed and/or underexposed areas. Such difficulty is accentuated in the illumination of the inner surface of the outer wall for checking the carcass. The Applicant has observed that by suitably deforming a portion of outer wall of a tyre to be checked it is possible to flatten the surface of at least one sub-portion of the deformed portion thus increasing the field depth and improving the illumination conditions for the detection of images, becoming more uniform. By suitably deforming a portion of outer wall of a tyre to be checked it is possible to decrease the outer radius of curvature of the deformed portion, thus highlighting possible defects, in particular carcass cuts and other cuts or holes, since the accentuation of the normal outer convexity tends to "open" the edges or perimeters of such defects, making them easier to identify in the subsequent image processing. Such an effect can also be obtained on the inner concave surface, by flattening.

The Applicant has observed that although in document WO 2015/004587 it is taught that it is possible to detect defects simultaneously in the inner and outer surface of the tyre by compressing a portion thereof and illuminating the tyre both inside and outside close to the deformed area, in the configuration described it is not always possible to identify some of the defects to be detected in a tyre. The Applicant has indeed understood that only when two different devices and two different types of illumination able to be emitted by distinct devices are combined with each other, is it possible to very reliably detect the defects at the inner surface and the outer surface of the tyre. In fact, the use of the same illumination or of the incorrect type of illumination for checking the entire tyre would lead to the lack of detection, or very difficult detection, through image processing, of some defects and in particular of some two-dimensional defects, i.e. that do not involve an alteration of the height of the surface, like for example the cuts at matching edges.

The Applicant has therefore set itself the problem of devising a method and an apparatus for checking tyres capable of acquiring images of the surface of a tyre, both inner and outer, in conditions of deformation, in particular for the simultaneous detection of more than one type of defect on the surface of the tyre, which is suitable for application on line within a tyre production line of a production plant, in other words suitable for being used with reduced costs and operative times, and capable of providing reliable results.

The Applicant has perceived that having a detection apparatus including a deformation system adapted for deforming a portion of tyre and at least two mutually distinct light sources associated with two distinct cameras, where one of the two light sources is capable of emitting a different type of light radiation with respect to the other light source, makes it possible to simultaneously illuminate an outer portion of deformed surface of tyre and an inner portion of deformed surface of tyre, in the most suitable manner according to the type of defect that it is wished to identify, and to adapt the acquisition of images both in diffused light and in grazing light particularly useful for the purposes of the aforementioned checking of the tyre.

More precisely, the Applicant has finally found that a method and an apparatus in which a first light source is provided for emitting diffused light against a deformed portion of outer surface of the tyre, said first source being associated with a first camera, and a second light source is provided for emitting an grazing light against a deformed portion of inner surface of the tyre, portions of inner and outer surface that can generally have different defects or that can require a different illumination in order for such defects to be able to be detected, with consequent acquisition of a first image and of a second image, makes it possible to make the checking of the tyre fast and at the same time to detect even different defects in a reliable and accurate manner. The illumination, both inner and outer, that is carried out at the same time as a deformation of the illuminated portion of the surface or at least of part thereof. According to a first aspect, the invention relates to an apparatus for checking a tyre.

Preferably, a support is provided adapted for receiving said tyre thereupon.

Preferably, a deformation system is provided configured to form an elastically deformed portion of inner surface and a deformed portion of outer surface on said tyre through physical contact.

Preferably, the apparatus comprises a first light source adapted for emitting a first light radiation to illuminate said deformed portion of outer surface with diffused light radiation, a first camera adapted for detecting a first image of said illuminated deformed portion of outer surface and for generating at least one control signal representative of said first image detected, and a first control unit that drives said first light source and said first camera.

Preferably, a second light source is provided adapted for emitting a second light radiation to illuminate said deformed portion of inner surface with grazing light radiation, a second camera adapted for detecting at least one second image of said illuminated deformed portion of inner surface and to generate at least one control signal representative of said at least one second image detected, and a second control unit that drives said second light source and said second camera.

Preferably, a moving member is provided that is adapted for setting said support in relative rotation with respect to said first light source, to said second light source and to said deformation system around a rotation axis of the tyre.

Preferably, a processing unit is provided configured so that while said first light source and said second light source illuminate said deformed portion of outer surface and said deformed portion of inner surface, said deformation system acts and said moving member imparts said relative rotation.

In accordance with a second aspect, the invention relates to a method for checking a tyre in a tyre production line.

Preferably, it is foreseen to provide a tyre to be checked.

Preferably, it is foreseen to deform a portion of outer surface of said tyre so as to form an elastically deformed portion of inner surface and an elastically deformed portion of outer surface.

Preferably, it is foreseen, at the same time as the aforementioned deformation, to illuminate said deformed portion of outer surface with a first diffused light radiation emitted by a first light source.

Preferably, it is foreseen to acquire a first image of said deformed and illuminated portion of outer surface through a first camera.

Preferably, it is foreseen, at the same time as the aforementioned deformation, to illuminate said deformed portion of inner surface with a second grazing light radiation emitted by a second light source.

Preferably, it is foreseen to acquire at least one second image of said deformed and illuminated portion of inner surface through a second camera.

Preferably, it is foreseen to set said tyre in relative rotation around a rotation axis of the tyre with respect to said first light source and to said second light source during said deformation and illumination.

The Applicant considers that providing a method and an apparatus in which three devices are present simultaneously, in other words a deformation system, a first light source associated with a first camera for illuminating a portion of outer surface, and a second light source associated with a second camera for illuminating a portion of inner surface of the tyre, makes it possible to make the checking of the tyre faster and more reliable, and at low cost. In this way, indeed, while a portion of the tyre is deformed by the deformation system, at the same time two types of defects in two distinct positions of the tyre can be detected. The Applicant indeed considers that it has studied and provided a method and an apparatus in which it is possible to minimise the time necessary to carry out many distinct measurements through compression using a first source emitting diffused light that is optimised for the illumination of visible defects in a deformed portion of outer surface of the tyre in combination with a second source for illuminating a second portion of tyre in an optimised manner to detect another type of defect. Advantageously, in synchrony with the illumination, a first and a second image are detected through a first and a second camera.

The present invention, in at least one of the aforementioned aspects, can also have one or more of the preferred characteristics described hereinafter.

Preferably, the second camera defines an optical plane and said second light source includes a third sub-source adapted for emitting a light radiation to illuminate said deformed portion of inner surface with grazing light radiation and a fourth sub-source adapted for emitting a light radiation to illuminate said deformed portion of inner surface with grazing light radiation, said third sub-source and said fourth sub-source being arranged on opposite half-planes with respect to said optical plane.

A symmetry in the sources, in this case of the second light source that comprises a third sub-source and a fourth sub-source, which are arranged at the two sides of the optical plane of the detection system, allows an easier comparison of images detected by the second camera while the portion of inner surface is illuminated with the light radiation of the third sub-source or of the fourth sub-source. These illuminations are in both cases grazing, but are different for their different—preferably specular—spatial origin.

More preferably, said third sub-source and said fourth sub-source are arranged symmetrically with respect to said optical plane.

As stated above, a symmetry of the sub-sources allows an easier comparison of the images detected through an alternate illumination with the third sub-source and with the fourth sub-source.

Preferably, the apparatus includes a third light source adapted for emitting a third light radiation, to illuminate said deformed portion of inner surface with diffused light radiation.

The third light source preferably emits a light radiation that, at the level of the portion of inner surface, is diffused on the deformed portion of inner surface, whereas the third sub-source and/or the fourth sub-source emit a light radiation on the second portion of surface that, at the level of the second portion of surface, is grazing. Advantageously obtaining many images of the deformed inner surface to identify defects with two different types of light radiation, grazing and diffused, allows an easier detection of defects through the comparison of the images with different illumination.

More preferably, said second camera defines an optical plane and said third light source is arranged symmetrically with respect to said optical plane.

Advantageously, as already stated above, a symmetry of the light sources allows simpler processing of the images detected by the portion of surface illuminated.

Preferably, said first control unit and second control unit are configured to drive said first light source and at least one from said third sub-source, said fourth sub-source and said third light source, so that an illumination of said deformed portion of outer surface and of said deformed portion of inner surface takes place simultaneously. Advantageously, deformation and illumination of both of the surface portions, outer and inner, takes place simultaneously to reduce the times intended for checking the tyre. In the case in which the first light source and/or the second light source includes more than one sub-source, the simultaneous illumination takes place through at least one of the sub-sources of the first light source and at least one of the sub-sources of the second light source that at the same time illuminate the outer and inner surface with diffused and grazing radiation, respectively.

Preferably, the apparatus includes a first arm adapted for moving said first light source and said first camera.

Preferably, the apparatus includes a second robotised arm adapted for moving said second light source and said second camera.

An arm, preferably robotised, allows an optimal movement in all directions of space of the first camera and/or of the second camera with associated source of light radiation so as to be positioned in space in the optimal manner for a correct illumination of the portion of outer and/or inner deformed surface of the tyre.

Preferably, said first light source is integral with said first camera.

Preferably, said second light source is integral with said second camera.

Preferably, said third light source is integral with said second camera.

Advantageously, the first camera is made integral with the first light source and similarly preferably also the second camera is made integral with the second light source and/or with the third light source so that the arm, preferably robotised, can move them both in a single movement. Therefore, preferably, the relative position between the cameras and the respective light sources is fixed.

Preferably, said first camera is a linear camera.

Preferably, said second camera is a linear camera.

A type of camera for acquiring images is for example a linear camera defining a target line, intersection of the optical plane on a focal plane in which or close to which the deformed surface portion, inner or outer, is preferably arranged, when illuminated. Therefore, linear surface portions are illuminated that can be obtained close to said target line, and, due to the relative rotation of the tyre, they "run" in temporal succession. For example, such a succession of linear portions can be obtained by rotating the tyre about a rotation axis thereof, or by rotating the detection system and the light sources around the tyre. Preferably, at least one complete rotation of 360° is carried out. More preferably, a rotation of more than 360° is carried out to have a correct juxtaposition between the initial and end part (which must match) of the tyre from where images begin and end being acquired.

Preferably, said second camera defines an optical plane and wherein said apparatus includes a reflective element defining a reflective plane arranged perpendicular to said optical plane.

The advantageous interposition of a reflective element makes it possible to visualise portions of the inner surface of the tyre, not visible otherwise, for the following reasons. A tyre has a diameter in general much greater than its width and therefore a device adapted for at least partially entering into a tyre and detecting defects thereof must preferably maintain a substantial compactness in particular in the extension corresponding to the width of the tyre. Positioning the camera therefore "behind" the light sources so as to directly detect the light reflected by the inner surface of the tyre would make the device unsuitable for examining some portions of the inner surface of the tyre, in particular portions relative to the inner surface corresponding to the sidewall and to the shoulder, since the extension of camera and light sources one behind the other is generally too high. The presence of a reflective element allows a different positioning between light sources and camera so as to obtain a very compact device, in particular in one direction.

More preferably, said reflective element is arranged symmetrically to said optical plane.

In this way a symmetrical reflection is obtained on the camera of the light coming from the illuminated inner surface of the tyre.

Preferably, a minimum distance between said reflective plane and a focusing plane of said second camera passing at least partially through said deformed portion of inner surface is smaller than a minimum distance between said second light source and said focusing plane.

The Applicant considers that it is preferable to be able to approach to a relatively short distance from the inner surface of the tyre so as to illuminate it with a high light intensity, without using light sources of a power such as to cause a high dispersion of heat. The Applicant has found that, since the presence of different light sources is preferred to have different types of illumination, grazing and diffused, optimal for detecting defects, as well as a high light intensity in the surface portion to be illuminated, this aspect also involves a relative "widening" of the dimensions of the device in the direction, at the side of the optical plane, in which all of these light sources are positioned. The Applicant therefore considers that providing a reflective element that is the "closest" element to the surface to be checked, keeping the light sources further away, allows a minimisation of the distance of the optical path of the light emitted by the light sources that is reflected by the surface portion of the tyre and detected by the second camera, therefore exploiting the entire light intensity produced by the light sources and at the same time minimising the risks of contact, and consequent damage, between device and tyre.

Preferably, said processing unit is configured to drive said deformation system to form an elastically deformed portion on a part of an outer surface of a shoulder of said tyre. Preferably, said processing unit, said first control unit and said second control unit, are configured to drive said first light source to illuminate a deformed portion of outer surface of a sidewall of said tyre con diffused light radiation, while said deformation system acts on said outer surface of said shoulder and said moving member imparts said relative rotation.

Preferably, said processing unit, said first control unit and said second control unit, are configured to drive said second light source to illuminate a deformed portion of inner surface of said shoulder of said tyre with grazing light radiation, while said deformation system acts on said outer surface of said shoulder and said moving member imparts said relative rotation.

Preferably, said processing unit is configured to drive said deformation system to form an elastically deformed portion on a part of an outer surface of a sidewall of said tyre. Preferably, said processing unit, said first control unit and said second control unit, are configured to drive said first light source to illuminate a deformed portion of outer surface of a shoulder of said tyre with diffused light radiation, while said deformation system acts on said outer surface of said sidewall and said moving member imparts said relative rotation.

Preferably, said processing unit, said first control unit and said second control unit, are configured to drive said second light source to illuminate a deformed portion of inner surface of said sidewall of said tyre with grazing light radiation while said deformation system acts on said outer surface of said sidewall and said moving member imparts said relative rotation.

The Applicant considers that with the compression and simultaneous illumination of deformed portion of inner and outer surface the best results are obtained in terms of defects detected when: either a portion of shoulder is compressed and simultaneously a portion of sidewall is externally illuminated and a portion of shoulder is internally illuminated, or a portion of sidewall is compressed and simultaneously a portion of shoulder is illuminated externally and a portion corresponding to the sidewall is illuminated internally.

Preferably, said deformation system includes a thrusting roller.

More preferably, the thrusting roller is mounted so as to be able to rotate freely about its own axis. Advantageously, the compression takes place through the roller resting against a surface portion of tyre. The roller, being able to rotate, keeps the portion compressed for a rotation of the tyre about its rotation axis, so that the same surface can be checked in any angular position. Preferably, the tyre is set in rotation and the position of the roller remains the same, rotating about its axis due to the rotation of the surface of the tyre with which it is in contact.

More preferably, the axis of the thrusting roller lies on a plane passing through a rotation axis of the tyre and through the radial direction of the deformed surface portion. In this way, an optimal compression of the surface of the tyre is carried out. Preferably, said rotation axis of said thrusting roller can be positioned at a predetermined angle with a rotation axis of said tyre. In this way, it is possible to "follow" the geometric shape of the surface of the tyre in an optimal manner, suitably inclining the rotation axis of the roller, so that a correct pressure is applied and that the latter is not modified by the geometric shape of the tyre.

Preferably, the thrusting roller can be positioned in two distinct positions. In the first, the rotation axis of the roller is substantially perpendicular to the rotation axis of the tyre. In the second, the rotation axis of the roller and the rotation axis of the tyre form an angle of 120°.

Preferably, said thrusting roller includes a portion with increased section at a central portion along said rotation axis and a portion with reduced section at an end thereof along said rotation axis. The central portion with increased section is preferably positioned at the shoulder or sidewall area where it is wished to look for the defects. However, a central portion of large dimensions can in certain situations create vibrations passing over the blocks of the tyre. For this reason a tapering of the axial ends of the roller itself is preferable, so that the area of the surface involved by the compression of the roller is limited and adjustable.

Preferably, said moving member is adapted for setting said support in relative rotation with respect to said first light source, to said second light source and to said deformation system around a rotation axis of the tyre for a rotation of at least 360° around said rotation axis of the tyre.

In this way, the tyre is checked in its entirety.

Preferably, illuminating said deformed portion of inner surface with a second grazing light radiation emitted by a second light source includes illuminating said deformed portion of inner surface with a fourth grazing light radiation and with a fifth grazing light radiation coming from the opposite half-planes with respect to an optical plane defined by said second camera.

A symmetry in the illumination, in this case of the second illumination, which comprises a fourth light radiation and a fifth light radiation emitted at the two sides of the optical plane of the detection system, allows an easier comparison of images detected by the second camera whereas the portion of inner surface is illuminated with the fourth light radiation or with the fifth light radiation. These illuminations are again grazing, but different for their different, preferably specular, origin.

More preferably, it is foreseen that illuminating said deformed portion of inner surface with said fourth grazing light radiation takes place at a different time with respect to the illumination with said fifth grazing light radiation of said deformed portion of inner surface.

In order to obtain images of the deformed portion of inner surface with more than one type of illumination, so that images having different illuminations can be compared in order to better detect defects possibly present, it is preferred to alternately illuminate with one or other type of light radiation, both grazing but coming from different half-planes, and acquire an image through the second camera at each illumination. Therefore, a synchronisation is preferably provided between the second camera and its acquisition of images and the switching on of the third sub-source or of the fourth sub-source.

Preferably, at the same time as the aforementioned deformation, it is foreseen to illuminate said deformed and illuminated portion of inner surface with a third diffused light radiation emitted by a third light source.

In this way, advantageously, the inner deformed surface is illuminated with two different types of light radiation, diffused and grazing, so as to highlight the defects more accurately by comparing images obtained through the two different light radiations.

Preferably, it is foreseen that illuminating said deformed portion of inner surface with said third diffused light radiation takes place at a different time with respect to the illumination of said deformed portion of inner surface with said fourth grazing light radiation or of said deformed portion of inner surface with said fifth grazing light radiation.

In order to obtain images of the deformed portion of inner surface with more than one type of illumination, so that images having different illuminations can be compared in order to better detect defects possibly present, it is preferred to illuminate alternately with one or other type of light radiation, one diffused and one grazing, and acquire an image through the second camera at every illumination. Therefore, preferably a synchronisation is foreseen between the acquisition of images of the second camera and the switching on of the third light source, or of the third sub-source, or of the fourth sub-source.

Preferably, it is foreseen to illuminate with said first light source at the same time as illuminating with at least one from said third sub-source, said fourth sub-source and said third light source, so that an illumination of said deformed portion of outer surface and of said deformed portion of inner surface takes place simultaneously.

Preferably, said deformation is carried out by applying a force.

More preferably, said force includes a component in the direction of a rotation axis of said tyre. The tyre is thus "compressed" along its rotation axis so as to highlight defects, like for example cuts, which can be formed along a sidewall or a shoulder thereof.

More preferably, said component of said force is in a direction towards a middle plane of said tyre. Advantageously, the tyre is compressed from the outside towards the inside, i.e. it is compressed by applying a force in a portion of outer surface thereof facing towards the inside of the tyre.

Preferably, it is foreseen to bring said first light source towards said deformed portion of outer surface to a distance comprised between about 55 mm and about 75 mm. As an example, said distance can be equal to 65 mm.

Preferably, it is foreseen to bring said second light source towards said deformed portion of inner surface to a distance comprised between about 50 mm and about 60 mm.

The Applicant considers that these distance ranges between the light sources and the surface to be illuminated, whether inner or outer, are an optimal compromise between a desired distance as close as possible to the surface so as to exploit the power of the light sources in the illumination of the surface and the risk of touching the tyre. Preferably, it is foreseen to remove said deformation from said tyre.

Preferably, it is foreseen to further deform a different portion of outer surface of said tyre so as to generate a further portion of outer deformed surface and a further portion of inner deformed surface.

Preferably, it is foreseen, at the same time as the aforementioned further deformation, to illuminate said further deformed portion of outer surface with said first diffused light radiation.

Preferably, it is foreseen to acquire a third image of said further deformed and illuminated portion of outer surface through said first camera.

Preferably, it is foreseen, at the same time as the aforementioned further deformation, to illuminate said further deformed portion of inner surface with said second grazing light radiation.

Preferably, it is foreseen to acquire at least one fourth image of said further deformed and illuminated portion of inner surface through said second camera.

Preferably, it is foreseen to set said tyre in relative rotation around a rotation axis of the tyre with respect to said first light source and to said second light source during said deformation and illumination.

The Applicant considers that the simultaneous inner and outer compression and illumination of the tyre is optimal in two at least partially distinct portions of the tyre. Therefore, it is advantageous to carry out a first check, for example through deformation of a first portion of outer surface with simultaneous illumination of the consequent deformed inner and outer surface and then a second check, by moving the deformation area into a second portion of outer surface, at least partially distinct from the first, and repeat the check through inner and outer illumination. Preferably, the first portion is a portion of sidewall of the tyre, whereas the second portion is a portion of shoulder of the tyre.

Further characteristics and advantages will become clearer from the detailed description of some example, but not exclusive, embodiments of an apparatus and of a method for checking tyres, in accordance with the present invention. Such a description will be outlined hereinafter with reference to the attached figures, provided only for indicating and therefore not limiting purposes, in which:

FIG. 1 shows a partial and schematic perspective view of an apparatus for checking tyres in a tyre production line;

FIG. 4 shows a detail of the apparatus of FIG. 3 in enlarged scale;

FIGS. 5 and 6 show a side and perspective view, respectively, of a further detail of the apparatus of FIGS. 1-3 in a schematic manner;

FIG. 7 shows a perspective view of an embodiment of the detail of FIGS. 5 and 6;

FIG. 10 shows a partial and schematic perspective view of another further detail of the apparatus of FIG. 2 or 3;

FIG. 11 shows a schematic side view of the detail of FIG. 10;

FIG. 13 shows a further perspective view of the detail in the embodiment of FIG. 12.

Figure 2:
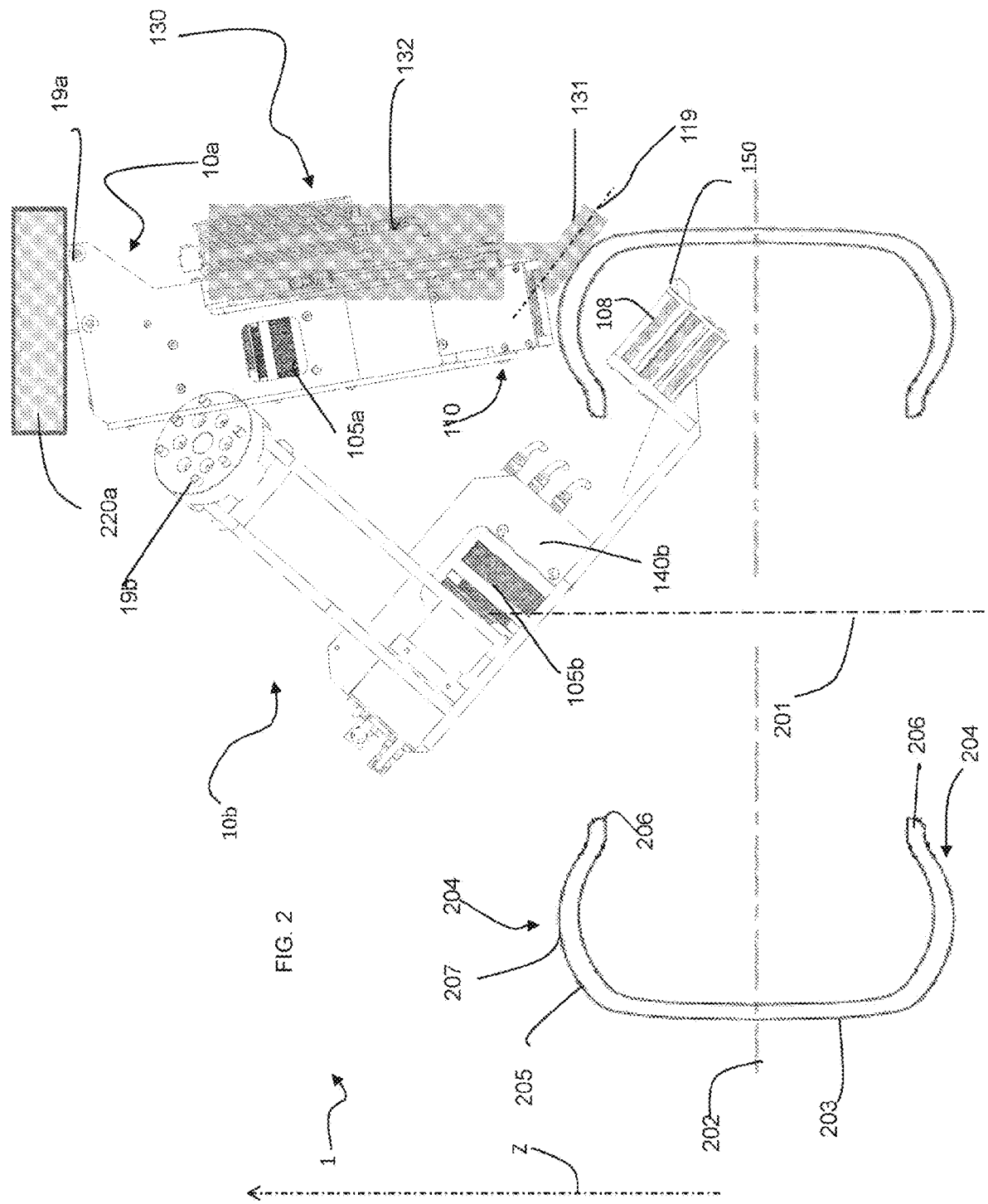
FIG. 2 shows a partial and partially sectioned side view of the apparatus for checking tyres in accordance with the present invention of FIG. 1 in an operative step.
Figure 3:
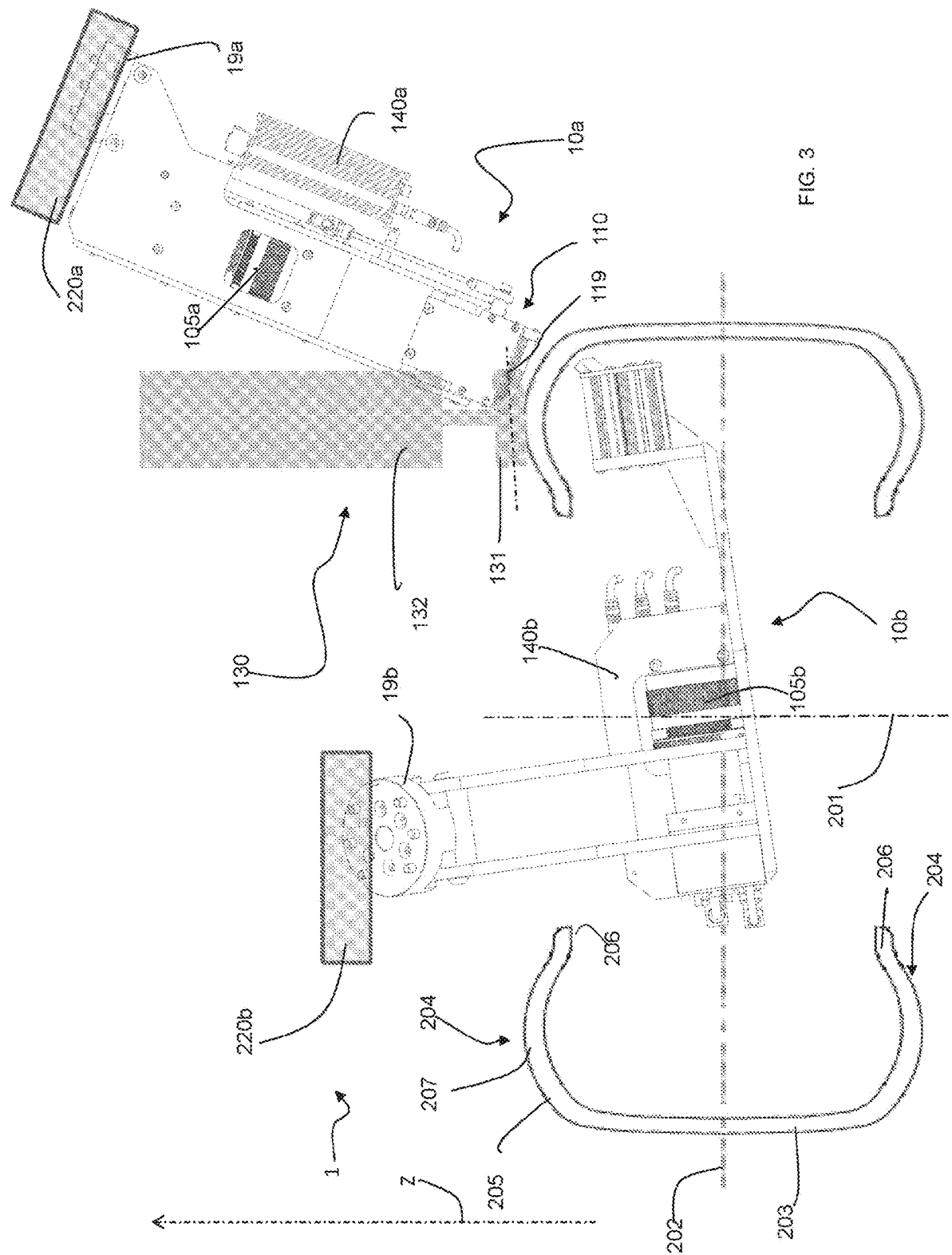
FIG. 3 shows the apparatus of FIG. 2 in a distinct operative step.

An apparatus for checking tyres in a tyre production line according to the present invention is globally indicated with 1 and depicted in FIGS. 1-3. In general, the same reference numeral will be used for possible variant embodiments of similar elements.

The apparatus 1 comprises a support 102 (visible in FIG. 1) adapted for supporting a tyre 200 on a sidewall and for rotating the same around its rotation axis 201, typically arranged according to the vertical. The support 102 is typically actuated by a moving member not described and illustrated any further, since it can as an example be of the known type. The support for the tyre can possibly be configured to lock it, for example the respective resting bead or the outer tread. The tyre 200 rested in the support therefore defines a free side surface, representing the portion of surface not resting on the support and facing, in an axis system coordinated with an axis Z perpendicular to the plane of the support, upwards.

With reference to FIGS. 2 and 3, the tyre 200 has a substantially toroidal structure around the rotation axis 201, and has an axial middle plane 202 (represented in section by a broken straight line in FIGS. 2 and 3) perpendicular to the rotation axis 201. The tyre is made up of a crown 203 and of outer walls 204. In turn, the latter are each made up of a shoulder area 205, a bead area 206 and a central area or sidewall 207 arranged between shoulder and bead, as can be seen in FIGS. 2 and 3.

The apparatus 1 includes a deformation system 130, for example moved by a processing unit 180 (visible in a schematic manner in FIG. 1), which goes into contact with the tyre, preferably at its outer wall 204, to deform a portion thereof, for example preferably through the application of a force against the outer wall 204 so as to deform a portion thereof, more preferably in the direction of the middle plane 202. Preferably, the deformation system 130 comprises a compression member 131 and a positioning actuator 132 adapted for moving the compression member along the direction of the compression force. As an example, the positioning actuator 132 can be a pneumatic cylinder. Therefore, the compression member can be brought into contact with or away from the tyre 200. Preferably, the compression member 131 comprises a thrusting roller.

Preferably, the thrusting roller is rotatable around a rotation axis thereof, indicated with 119 in FIGS. 2 and 3. The axis 119 of the thrusting roller preferably lies on a plane passing through the axis 201 of the tyre 200 and through the radial direction of the portion of outer wall subjected to deformation. Preferably, the axis 119 of the compression roller, in the absence of forces, in other words in rest position, is perpendicular to the axis of the tyre. The axis of the roller, in operation, can differ from such a perpendicular condition with the axis of the tyre (as shown for example in FIG. 2) for example within a range of 30° from the perpendicular condition.

Furthermore, the thrusting roller, visible in detail in FIG. 4, comprises a section, taken in a plane perpendicular to the rotation axis 119, which is substantially circular. A diameter of the section is preferably variable, from a minimum diameter present at a first end 118a and at a second axially opposite end 118b of said roller along the rotation axis 119 to a maximum diameter present in a central area of the roller.

Preferably the deformation system 130 comprises a radial moving member (not shown, for example a further electric motor and a system of guides and sliding blocks to guide the radial movement) adapted for moving the deformation member and the positioning actuator as a unit along the radial direction of the tyre. Therefore, the deformation element can be taken away from the tyre when not in use.

Preferably, the deformation system 130 is adapted for elastically deforming a portion of an outer wall of the tyre 200, preferably applying a compression force on an outer contact surface belonging to the portion of outer wall, pressing the aforementioned thrusting roller on the outer contact surface. The force applied or the movement imposed on the outer contact surface along a rotation axis of the tyre is predetermined and depends on the type of tyre to be checked. The tyres 200 can have a different elasticity and deformability according to the type and model, therefore the force applied or the deformation imposed by the deformation system 130 preferably depends on the type of tyre 200 to be checked. The deformation involves both the inner surface and the outer surface of the tyre 200, i.e. a deformation generated by the deformation system 130 acting on a portion of outer surface of the tyre consequently defines a deformed portion of outer surface of the tyre and a deformed portion of inner surface of the tyre.

The apparatus 1 comprises a first arm 220a, preferably robotised, on which a first device 10a is mounted; in particular, the first device 10a comprises a first attachment member 19a for coupling with an end of the first arm 220a. The first arm 220a is represented only very schematically in FIGS. 2 and 3. Preferably, the first arm 220a is an anthropomorphous robotised arm, even more preferably it is an anthropomorphous robotised arm with at least five axes/degrees of freedom.

The first device 10a is adapted for the illumination and the detection of images on the outer surface of the tyre 200, and in particular on portions of outer surface deformed by the thrusting roller.

With reference now to FIGS. 5 and 6, the first device 10a is represented in simplified form to clearly identify the functional parts thereof. Preferably, the first device 10a comprises a first detection system 104a comprising a first camera 105a. The camera 105a is preferably a linear camera having a target line 106a lying on a first optical plane 107a passing through the first linear camera 105a. Moreover, the first camera 105a defines a first focal plane 121a in which a portion to be illuminated of outer surface of tyre is substantially focused on. Preferably, the optical plane 107a of the first camera 105a and the first focal plane 121a are perpendicular to one another (see for example FIG. 5 or 6).

The first device 10a also comprises a first light source 110 adapted for emitting a first light radiation to illuminate a linear portion of outer surface 212 (visible in FIGS. 1 and 6) of said tyre 200 coincident with the first target line 106a (for example when the surface portion is planar) or close to the first target line 106a (due to the curvilinear shape of the surface of the tyre).

The first detection system 104a is adapted for acquiring a respective two-dimensional digital image of the linear portion of surface illuminated by the first light source 110. The first light radiation emitted by the first light source 110 is diffused on the linear surface portion 212 of the tyre 200. The first detection system, through the first camera 105a, is adapted for acquiring a respective first two-dimensional digital image of the linear surface portion 212 illuminated by the first light radiation.

Preferably, the first light source 110 consists of two sub-sources, a first sub-source 113a and a second sub-source 113b, respectively, arranged on both sides of the optical plane 107a and symmetrically with respect to such a plane. More in particular, the first sub-source 113a and the second sub-source 113b of the first light source 110 are arranged symmetrically with respect to the first optical plane 107a and are more preferably equidistant from it.

Preferably, the first sub-source 113a and the second sub-source 113b of the first light source 110 are the same distance d1a and d1b from the focusing plane 121 (i.e. d1b=d1a). Therefore, when the two sub-sources are joined by a plane, called P1 (see FIG. 5), said plane P1 is substantially parallel to the focusing plane 121a of the first linear camera 105a and distant from it by a value d1a comprised between about 55 mm and about 75 mm, as an example equal to about 65 mm.

Each sub-source 113a, 113b of the first source 110 has a respective main direction of extension (broken line 114 in FIG. 6) that extends preferably substantially parallel to the optical plane 107a and thus to the first target line 106a. Therefore, the two sub-sources 113a, 113b are preferably parallel to one another, i.e. aligned, along their dimension of greatest extension.

As an example, the sub-sources 113a, 113b have a dimension along the main direction of extension 114 comprised between about 5 cm and about 15 cm and a dimension along the direction perpendicular to the main direction of extension 114 comprised between about 2 cm and about 3 cm.

Figure 9:
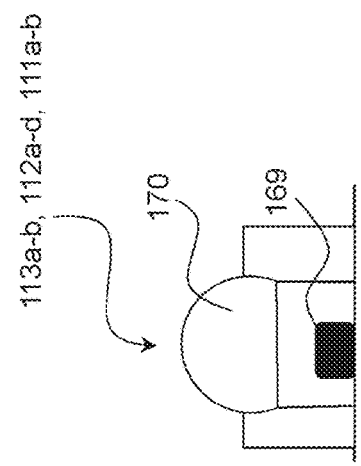
FIG. 9 shows a schematic side section view of a detail of FIG. 7 or 8.

Each sub-source 113a, 113b typically comprises a plurality of LED sources 169 arranged aligned along the main direction of extension 114. Preferably, each sub-source 113a, 113b comprises, positioned above each LED source 169, a converging lens 170, adapted for converging the light beam emitted by the LED source 169 by about 30° (FIG. 9). The light beam emitted by each LED source 169 is therefore preferably restricted to an angle comprised between about 20° and about 40°.

Figure 8:
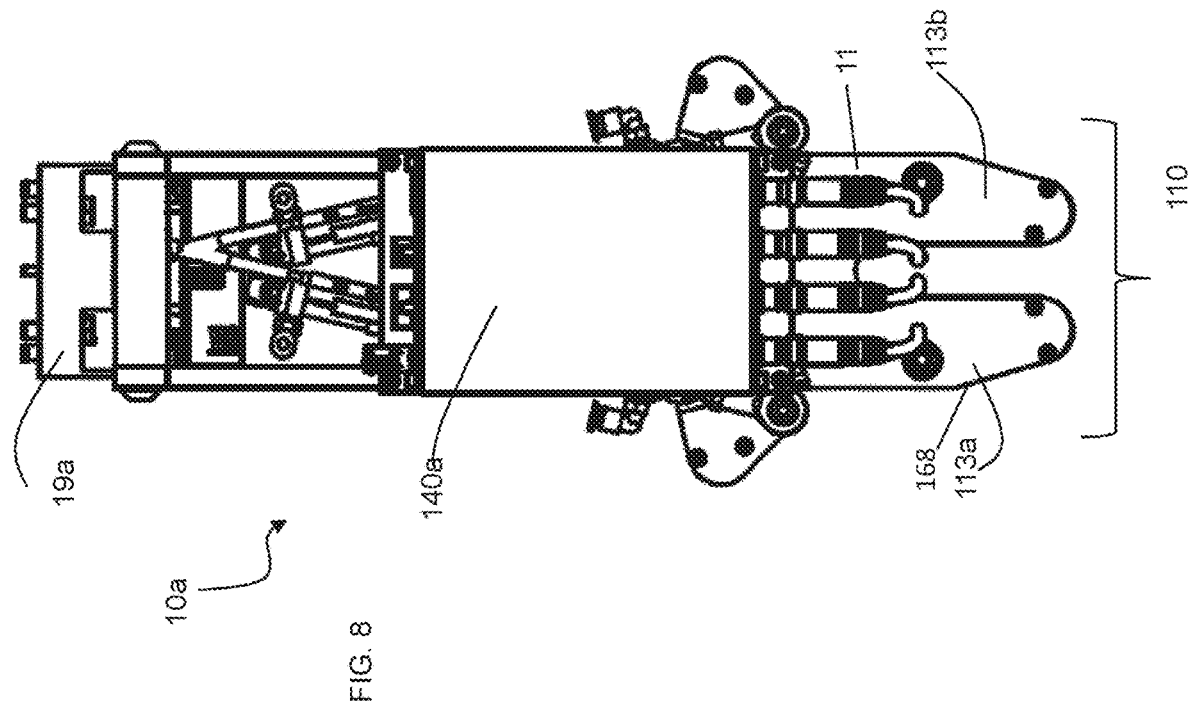
FIG. 8 shows a view from above of the embodiment of the detail of FIG. 7.

A representation of an embodiment of the device represented in a simplified manner in FIGS. 5-6 and 9 is given in FIGS. 7 and 8.

Each sub-light source 113a, 113b includes a support, preferably made of aluminium, on which the LED sources 169 are fixed. The supports are all indicated with 168 in the attached figures (see FIGS. 7 and 8). Preferably, the LED sources 169 are fixed to the respective support 168 through a thermo-conductive paste (not visible in the figures). Advantageously, each support 168 also includes, in an outer surface not in contact with the LED sources, a fin arrangement for the dissipation of heat (not visible in the figures).

The first sub-source 113a and the second sub-source 113b of the first light source 110 are positioned between two plates 11, 12 arranged substantially perpendicular to the main direction of extension 114 of the first light source 110 and substantially parallel to each other. Between the two plates 11, 12, which extend downstream of the first light source in the direction of emission of the light, the first linear camera 105a is also positioned.

The two sub-sources 113a, 113b of the first light source are arranged so that for their entire extension in a view perpendicular to the optical plane 107a they lie between two planes perpendicular to the target line 106a. In other words, all of the first and second ends of the sub-sources 113a, 113b with respect to the main direction of extension 114 lie on a respective plane perpendicular to the target line 106a.

Preferably, the first device 10a comprises a first drive and control unit 140a configured to activate said first light source and activate the first linear camera 105a to acquire a respective two-dimensional digital image (in colour or monochromatic) of the linear surface portion, preferably in synchrony with the activation of one or more of said first sub-light source 113a and second sub-light source 113b.

Preferably, the first drive and control unit 140a is fixed to a support plate 11, 12 of the first light source 110 and of the first camera 105a so as to send signals relative to the control of the sub-light sources 113a, 113b without waiting times.

Preferably the processing unit 180 is adapted for driving the deformation element 130 and the first arm 220a so as to bring the deformation element 130 towards or away from the tyre 200 to deform, or not, a portion of surface, while the first arm 220a takes the first device 10a to a predetermined distance from the outer surface of the tyre to be illuminated and checked.

For greater heat dissipation, moreover, the first unit 140a also comprises a fin arrangement 166 (visible in FIG. 7).

The apparatus 1 also includes a second device 10b preferably moved, through control signals sent by the processing unit 180, through a second preferably robotised arm 220b. Preferably, the second arm 220b is an anthropomorphous robotised arm, even more preferably it is an anthropomorphous robotised arm with at least five axes/degrees of freedom. The second device 10b is preferably adapted for the illumination and the detection of images of portions of the inner surface of the tyre 200 (see FIG. 1) and more preferably portions deformed by the deformation system 130 of the inner surface.

With reference now to FIGS. 10 and 11, the second device 10b is represented in simplified form to clearly identify the functional parts thereof. Preferably, the second device 10b comprises a second detection system 104b comprising a second camera 105b. The second camera 105b is preferably a linear camera having a second target line 106b lying on an optical plane 107b passing through the same camera 105b. Moreover, the second camera 105b defines a second focal plane 121b in which a portion to be illuminated of tyre surface is focused on. Preferably, the optical plane 107b and the focal plane 121b are perpendicular to each other (see for example FIG. 10 or 11).

The second device 10b also comprises a second light source 108 and a third light source 109 adapted for respectively emitting a second and a third light radiation to illuminate an inner linear surface portion 213 (visible in FIGS. 1 and 10) of said tyre 200 coincident with the target line 106b (for example when the surface portion is planar) or close to the target line 106b (due to the curvilinear shape of the surface of the tyre).

The second detection system 104b is adapted for acquiring a respective two-dimensional digital image of the linear surface portion illuminated by at least one from the second light source 108 and the third light source 109, and deformed by the deformation system 130.

The second light radiation emitted by the second light source 108 is grazing on the linear surface portion 213 of the tyre 200, whereas the third light radiation emitted by the third light source 109 is diffused on the surface portion 213 of the tyre 200.

The second detection system 104b, through the second camera 105b, is adapted for acquiring a respective two-dimensional digital image of the linear surface portion 213 illuminated by at least one from the second light radiation and the third light radiation. Preferably, the second light source 108 consists of two sub-sources, a third sub-source 111a, and a fourth sub-source 111b, the two sub-sources being positioned symmetrically with respect to the optical plane 107a. Preferably, the two sub-sources 111a and 111b respectively lie at opposite sides with respect to the optical plane 107b and are equidistant from it, so that grazing radiation coming from opposite half-spaces with respect to the optical plane of the second camera 105b reach the inner linear surface portion 213.

Preferably, the sub-sources 111a, 111b of the second light source 108 are the same distance $d_{2a}$ and $d_{2b}$ from the second focusing plane 121b (i.e. $d_{2a}=d_{2b}$). Therefore, forming a plane P3 that joins the two sub-sources 111a and 111b, it is substantially parallel to the focusing plane 121b of the second linear camera 105b and is preferably distant from it by a value comprised between about 55 mm and about 65 mm. The plane P3 and its distance from the focusing plane 121b called $d_{2a}$ (which is equal as stated to $d_{2b}$) is schematically represented in FIG. 11.

Preferably, the third light source 109 consists of four sub-sources, a fifth sub-source 112a, a sixth sub-source 112b, a seventh sub-source 112c and an eighth sub-source 112d, respectively, distributed in pairs on both sides of the optical plane 107b and symmetrically with respect to such a second plane. More specifically, the fifth sub-source 112a and the sixth sub-source 112b of the third light source 109 are arranged symmetrically with respect to the optical plane 107b and are more preferably equidistant from it, and the seventh sub-source 112c and the eighth sub-source 112d are arranged symmetrically with respect to the optical plane 107b and more preferably are equidistant from it.

Preferably, the fifth sub-source 112a and the sixth sub-source 112b of the third light source 109 are the same distance d3a and d3b from the focusing plane 121b (i.e. d3b=d3a). Therefore, when the two sub-sources are joined by a plane, called P2 (FIG. 11), they define a plane P2 substantially parallel to the focusing plane 121b of the second linear camera 105b and distant from it by a value $d_{3a}$ comprised between about 85 and about 95 mm. Similarly, the seventh sub-source 112c and the eighth sub-source 112d of the third light source 109 are the same distance d3c and d3d from the focusing plane 121b (i.e. d3c=d3d). Therefore, when the two sub-sources 112c and 112d are joined by a plane, they define a plane P4 substantially parallel to the focusing plane 121b of the second linear camera 105b and distant from it by a value comprised between about 75 mm and about 85 mm.

Preferably, the distance d3a=d3b between the fifth sub-light source 112a and the focusing plane 121b and between the sixth sub-light source 112b and the focusing plane 121b of the second linear camera 105b is greater than the distance $d_{2a}=d_{2b}$ between the second illumination source 108 and the focusing plane 121b. More preferably, the distance d3c=d3d between the seventh sub-source 112c and the focusing plane or between the eighth illumination sub-source 112d and the focusing plane 121b is intermediate between the distance of the fifth sub-source 112a and of the sixth sub-source 112b and the focusing plane 121b and the distance of the second source 108 and the focusing plane 121b. As a result the third illumination source 109 of diffused light is further from the linear surface portion 213 of the tyre 200 to be illuminated with respect to the second source 108, whereas the second illumination source 108 generating grazing light is positioned closer. In this way, it is possible to obtain an grazing light with a correct geometry of the second device 10b.

Each sub-source 111a, 111b, 112a, 112b, 112c, 112d has a respective main direction of extension (broken line 115 in FIG. 10) that preferably extends substantially parallel to the optical plane 107b and thus to the second target line 106b. Therefore, all of the sub-sources 111a, 111b, 112a, 112b, 112c, 112d, are preferably parallel to one another, i.e. aligned, along their dimension of greatest extension.

As an example, the sub-sources 111a, 111b, 112a, 112b, 112c, 112d, have a dimension along the main direction of extension 114 comprised between about 5 cm and about 15 cm and a dimension along the direction perpendicular to the main direction of extension 114 comprised between about 2 cm and about 3 cm.

Each sub-source 111a, 111b, 112a, 112b, 112c, 112d, typically comprises a plurality of LED sources 169 arranged aligned along the main direction of extension 115. Preferably, each sub-source 111a, 111b, 112a, 112b, 112c, 112d, comprises, positioned above each LED source 169, a converging lens 170, adapted for converging by about 30° the light beam emitted by the LED source 169, as represented in FIG. 9. The light beam emitted by each LED source 169 is therefore preferably restricted by an angle equal to between about 20° and about 40°. Preferably the sub-sources 111a, 111b, 112a, 112b, 112c, 112d, are made in an analogous manner to the sub-sources 113a, 113b of the first device 10a.

Figure 12:
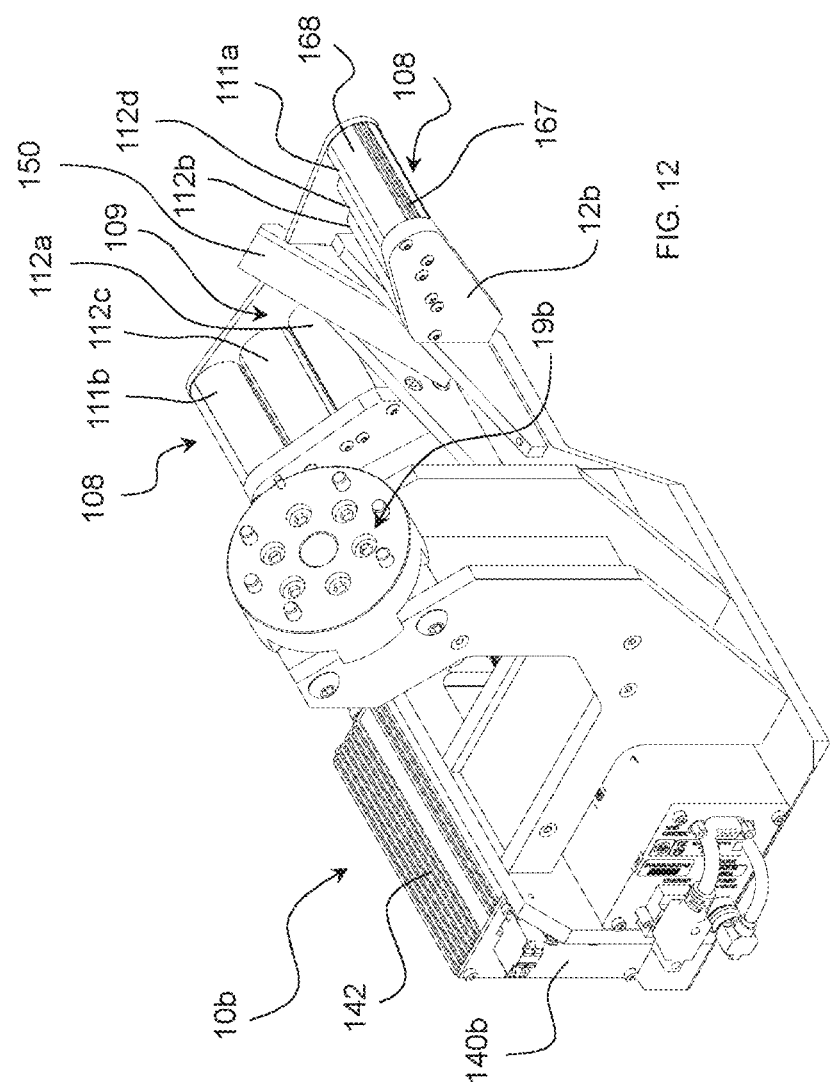
FIG. 12 shows a perspective view of an embodiment of the detail represented in FIGS. 9 and 10.

A representation of an embodiment of the second device 10b represented in a simplified manner in FIGS. 10-11 is given in FIGS. 12 and 13.

With particular reference to FIGS. 12 and 13, each of said second light source 108 or third light source 109, also includes a support 168, preferably made of aluminium, on which the LED sources 169 are fixed. Preferably, the LED sources 169 are fixed to the respective support 168 through a thermo-conductive paste (not visible in the figures). Advantageously, each support 168 also includes, in an outer surface not in contact with the LED sources 169, a fin arrangement 167 for the dissipation of the heat.

Typically, the second device 10b is coupled through an attachment 19b with the second arm 220b (only schematically represented in FIGS. 3 and 13) on which the second light source 108 and the third light source 109, as well as the detection system 104b are mounted.

More in particular, the device 10b comprises a first support 161, to which the second linear camera 105b is fixed and a second support 162 to which the second light source 108 and the third light source 109 are fixed. The first support 161 and the second support 162 are made to form a unit with each other by a connecting arm 164. The second support 162 comprises two equidistant plates 11b and 12b, between which the second light source 108 and the third light source 109 are arranged. Therefore, each sub-source 111a, 111b, 112a, 112b, 112c, 112d is connected with a first axial end thereof to the first plate 11b and with a second axial end thereof to the second plate 12b. In this way, along the main direction of extension 115, the sub-sources 111a, 111b, 112a, 112b, 112c, 112d, preferably are the same length being substantially confined between two planes parallel to one another.

Preferably, therefore, second camera 105b, second light source 108 and third light source 109 form a unit with each other and their relative distance is defined in the assembly step of the second device 10b and is kept fixed.

Preferably, the second device 10b comprises a second drive and control unit 140b configured to selectively activate one or more of said second light source 108 and third light source 109 and to activate the second linear camera 105b to acquire a respective two-dimensional digital image (in colour or monochromatic) of the linear surface portion, preferably in synchrony with the aforementioned activation of one or more of said second light source 108 and third light source 109.

Preferably, the second drive and control unit 140b is mounted so as to form a unit with the second camera 105b and with the light sources 108 and 109, in particular it is fixed to the first support 161 of the second device 10b. Moreover, preferably, the second drive and control unit 140b comprises a fin arrangement 142, for greater dissipation of heat.

The second device 10b also comprises a mirror 150 defining a reflective plane arranged perpendicular to the optical plane 107b. The mirror 150 is arranged between the two sub-sources 111a and 111b of the second light source 108, so as to reflect the target line by an angle comprised between about 60° and about 120°. Preferably, the mirror 150 is divided into two halves by the optical plane 107b that crosses a middle line thereof. Preferably, therefore, the mirror 150 is arranged not only between the sub-sources 111a-111b of the second light source 108, but is in the middle between, in sequence of spatial position, the seventh sub-source 112c, the fifth sub-source 112a on one side of the optical plane 107b, and the sixth sub-light source 112b and the eighth sub-light source 112d on the other side of the optical plane 107b. The mirror 150 also defines a main direction of extension indicated with 118 in FIG. 10. The main direction of extension is a straight line that belongs to the optical plane 107b. This main direction of extension 118 of the mirror is inclined with respect to the main direction of extension 115 of the sub-sources 111a, 111b, 112a, 112b, 112c, 112d. As stated earlier, preferably the sub-sources 111a, 111b, 112a, 112b, 112c, 112d, share a substantially common main direction of extension, being parallel to one another. This common main direction of extension 115 of the sub-sources preferably forms an angle comprised between 30° and 60° with the main direction of extension 118 of the mirror 150. More preferably, it forms an angle of about 45°.

Moreover, a minimum distance d (see again FIG. 11) between the mirror 150 and the focusing plane 121b of the second linear camera 105b passing through the reflected target line is less than a minimum distance between any one from the second light source 108 or the third light source 109 and the focusing plane 121b. In FIG. 11, the minimum distances of the sub-sources are equal to the distance of the plane passing through the sub-sources and the focusing plane 121b, since the sub-sources 111a, 111b, 112a, 112b, 112c, 112d, are substantially arranged parallel to the focusing plane 121b.

Preferably, the length of the mirror L along its main direction of extension 118 is greater than the length Is of any of the sub-sources 111a, 111b, 112a, 112b, 112c, 112d, along their main direction of extension 115. More preferably, calling the angle formed between the two directions 115 and 118 α, gives L cos α>ls.

In this way, as can be seen more clearly from FIGS. 10 and 11, the mirror is the element that extends, at least with respect to the light sources, the closest to the focusing plane 121b, in particular with an end thereof 150a, the end along its main direction of extension 118. In other words, the end 150a of the mirror protrudes with respect to the axial ends of the sub-sources 111a, 111b, 112a, 112b, 112c, 112d, in the direction of the focusing plane 121b.

Preferably, the mirror includes a reflective layer defining said reflective plane, said reflective layer being an outermost layer of said mirror on which an optical path of a light radiation directed to said camera 105 reflects.

With reference to FIGS. 1 to 3 the operation of the apparatus 1 will now be described in detail.

A surface portion to be checked, i.e. a portion of an outer wall of tyre for which it is wished to check a surface portion, both inner and outer, is selected in the surface of the tyre. Preferably, but not exclusively, this portion belongs to the shoulder or to the sidewall of the tyre 200.

The deformation system 130 is adapted for deforming a surface portion of the tyre in order to better identify the defects present, both in the inner surface and in the outer surface. The defects searched for can for example be irregularities on the surface of a tyre (unvulcanised compound, alterations in shape, etc.), structural unevenness, presence of foreign bodies on the surface. Among structural unevenness defects, so-called "carcass cuts" are particularly critical, which are rare but potentially very dangerous defects, generated in the interface region between two portions of the tyre having different chemical-physical characteristics, like for example different compounds.

Such defects are in the form of small cuts, typically extending longitudinally, i.e. they follow the circular extension of the tyre, characterised by perfectly matching edges—between which there is no removal or lack of material, this being a characteristic that makes them particularly difficult to identify. The carcass cuts can also involve structures of the carcass arranged close to the surface of the tyre, for example close to the inner surface, under the layer of liner typically present. In this case typically the liner itself is involved in the cuts, also having a laceration at the carcass cuts and thus making it possible to identify it through optical inspection.

By suitably deforming a portion of outer wall of a tyre to be checked it is possible to decrease the outer and inner radius of curvature of a deformed surface portion of the tyre, thus highlighting possible defects, in particular carcass cuts and other cuts or holes, since the accentuation of the normal external convexity tends to 'open' the edges or perimeters of such defects, making them easier to identify in the subsequent image processing.

The images detected of this adequately compressed surface portion thus have a high quality and/or contain information in number and quality such as to allow a subsequent automatic processing of the latter in order to detect possible defects existing, making the algorithms for automatically detecting defects used for this purpose highly effective.

This type of defect, in order to be properly identified, requires an illumination of relative high power and close to the deformed portion of tyre, i.e. positioning of the device very close to the deformation element, otherwise the cut opened by the deformation element "closes" as soon as a distance is reached from the area in which the deformation takes place.

For this reason a diffused light and preferably with relatively high power is the best solution for highlighting such a defect in the deformed outer surface of the tyre.

In the corresponding inner surface of the deformed portion of outer wall, the possible defects present, for example the possible cuts, are "opened" increasing the concavity of the inner surface due again to the compression. In order to become more visible, these defects need a particular illumination, with light radiation that arrives from "the sides" of the cut itself, preferably from "both sides", i.e. they require an illumination through grazing illumination. Moreover, even more preferably, the preferred illumination is a combination of grazing and diffused light radiation.

In the way described hereinafter, the optimal light radiation for identifying defects both in the inner and outer portion of the deformed wall is provided, simultaneously during the deformation.

The processing unit 180 drives the deformation system 130 to go into contact with the tyre, preferably at its outer wall 204, so as to apply a force against it and deform a surface portion thereof including the selected portion of tyre 200, as can be seen in FIG. 2. The deformation system 130 comes into contact with a portion of outer surface of the tyre 200 and its compression action generates a deformed portion of outer surface and a corresponding portion of inner surface. Preferably, as represented in FIG. 2, the portion of surface on which the deformation system 130 acts is a portion of the outer surface of the shoulder 205 of the tyre 200. Preferably, the entire remaining portion of the outer wall 204 of the tyre 200 remains undeformed. As an example, the compression force is such as to deform the portion of outer wall 204 so that the maximum excursion, taken between all of the points of said portion of outer wall, between the position in the absence of forces and the deformed position, the excursion being taken along the direction of the compression force, is equal to a value comprised between about +/−20 mm. This deformation is elastic, in other words when the deformation system 130 is removed, the deformed outer wall goes back to its initial configuration and shape, before the deformation by the system 130.

The first arm 220a and the second arm 220b carrying the devices 10a and 10b are consequently brought towards the deformed portions of outer and inner surface, respectively.

The first device 10a can get substantially close to the deformation system 130 (again see FIG. 2), thanks to its very compact configuration, to illuminate and acquire images of the portion of outer surface of tyre 200 deformed by the deformation element 130. The processing unit 180 drives the arm 220a to take the first light source 110 towards the deformed outer portion of the surface of the tyre 200, so that a linear portion 212 of surface inside the outer deformed portion is at least partially coincident with or close to the target line in the focal plane 121a. Preferably, the distance between the deformation system 130, and in particular thrusting roller 131, and the first device 10a is comprised between about 30 mm and about 50 mm. Preferably, if the deformed portion is a shoulder portion, like in FIG. 2, the portion of deformed and illuminated outer surface is a portion of sidewall.

The processing unit 180, therefore, drives the moving member of the support 102 to set the tyre 200 in rotation.

As a function of the angular position signal received by an encoder, with the rotation of the tyre in progress, the first drive and control unit 140a of the first device 10a cyclically activates in rapid sequence the first light source 110 and activates the first linear camera 105a to acquire a respective two-dimensional digital image (in colour or monochromatic) of the respective outer linear surface portion in synchrony with the activation of the first light source 110. The first control unit 140a will drive, in parallel, the switching on of the two sub-sources 113a, 113b, which work in synchrony with each other and in synchrony with the first linear camera 105a. The two sub-sources 113a, 113b, therefore switch on simultaneously.

More preferably, the first drive and control unit 140a drives the first light source 110 to emit a diffused light radiation on the first portion of outer surface 212 of the tyre 200, for example at a predetermined frequency. Such a stroboscopic frequency is for example equal to 0.1 ms. The first drive and control unit 140a further controls the first camera 105a to acquire an image of the deformed outer linear surface portion illuminated by the first light source 110 in synchrony with the illumination thereof. Therefore, a plurality of "first images" of the surface portion of tyre 200 illuminated every time the first light source 110 that illuminates the portion with diffused light is switched on is acquired by the first camera 105a.

Therefore, every time the first light source 110 is switched on, a first image is acquired of an outer surface portion of the tyre. With the rotation of the tyre, a plurality of linear images, or first images, are acquired, one for every angular position of the tyre.

Once the desired rotation of the tyre 200 has been carried out to examine the desired surface portion, preferably at least one complete rotation to acquire the entire circular extension, a digital image of a tyre "ring" is obtained, that is made with all of the first digital images of the sequence of linear portions each illuminated with the first light source. For a complete 360° image for example 25,000 single linear images are used. At the same time as the compression by the system 130 and as the illumination of the portion of deformed outer surface belonging to the sidewall 207, according to the invention a surface portion is checked in the inner surface of the tyre 200. Preferably, but not exclusively, this portion of inner surface to be checked belongs to the shoulder 205 of the tyre 200, if, according to FIG. 2, a portion of the shoulder 205 is compressed.

For this check, for example, as depicted in FIG. 2, the second device 10b is partially inserted inside the tyre 200 and brought closer—through the arm 220b—to the inner portion of shoulder 205. The second device 10b is brought closer until a linear portion 213 of the inner surface is substantially at its focusing plane 121b.

The second light source 108 and the third light source 109 are driven by the second drive and control unit 140b to emit a radiation on the inner linear surface portion 213 of the tyre 200. The second light source 108 emits grazing light radiation corning from opposite half-spaces with respect to the optical plane 107b, on the linear surface portion 213, whereas the third light source 109 emits diffused radiation on the linear portion 213. Preferably, both of the light sources emit light radiation at a predetermined frequency. The illumination with each source, however, takes place alternately: in other words for every time period only one from the second light source 108 or the third light source 110 is switched on, whereas the other of the two remains switched off. Preferably, the four sub-light sources 112a, 112b, 112c, 112d, of the third light source 109 are switched on together, i.e. in a given time period either all four are switched on or all four are switched off. Such a stroboscopic frequency is for example equal to 0.064 ms. Differently, the two sub-sources 111a, 111b of the second light source 108 are switched on alternately, i.e. one or the other, so that the deformed inner surface portion is illuminated either by an grazing light from the right of the optical plane 107b or from the left thereof.

The light corning from the second light source 108 or from the third light source 109 is reflected by the inner surface of the shoulder 205 of the tyre that has been illuminated and is re-directed through the mirror 150 towards the second camera 105b. The mirror 150 causes a deflection of the trajectory of the light beams by an angle comprised between about 60° and about 120°, more preferably about 90°.

The second drive and control unit 140b preferably controls the second camera 105b so as to acquire an image of the inner surface portion illuminated by the third sub-source 111a or by the fourth sub-source 111b or by the third light source 109 in synchrony with the illumination thereof. Therefore, advantageously, the second camera 105b acquires an image of the inner surface portion of tyre 200 illuminated each time the third sub-source 111a that illuminates the portion with grazing light from one side of the optical plane 107b is switched on, an image of the surface portion of tyre 200 illuminated each time the fourth sub-source 111b that illuminates the portion with grazing light from the other side of the optical plane 107b is switched on and an image of the surface portion of tyre 200 illuminated each time the third light source 109 that illuminates the portion with diffused light is switched on. In this way, advantageously, for every inner surface portion 213 three distinct images to be processed are acquired in which the same portion is illuminated with a light radiation having distinct characteristics. In this way it is possible to acquire both an image in diffused light and two images in grazing light of the same surface portion. These three images can also form distinct portions of a single two-dimensional image, in which a first portion is obtained with the diffused light, a second portion with grazing light from a first direction of the optical plane (for example from the right) and a third portion with grazing light from a second opposite direction of the optical plane (for example from the left).

Advantageously, in each of the operative positions represented in FIGS. 1-3, the support 102 in which the tyre is positioned (see FIG. 1) is set in rotation during the checking of the tyre itself. As stated above, the second drive and control unit 140b preferably controls the second camera 105b so as to acquire an image of the inner surface portion illuminated by the second source 108 or by the third light source 109 in synchrony with the activation thereof.

As stated above, the apparatus comprises an encoder (not shown) for detecting the angular position of the support, the second drive and control unit 140b being configured to activate said second light source 108 and third light source 109 and drive the detection system as a function of an angular position signal of the support sent by the encoder.

However, since the tyre is preferably in rotation while these three distinct images are acquired, they are not exactly the image of the same inner linear surface portion of tyre, since the latter is rotated during the switching on and off of the light sources.

As an example, the time difference between the acquisition of the first linear image and of the second linear image, as well as between the second linear image and the third linear image and then cyclically between the first linear image and the third linear image, is less than 0.2 milliseconds. Therefore, in this very limited time period, the movement is "relatively small" and therefore it is still possible to state that, for substantially the same surface portion three linear images are obtained, each with a different illumination.

The expression "substantially a same surface portion" means that the first light source 110, the second light source 108 and the third light source 109, illuminate three respective surface portions that can be spatially shifted from one another but are comparable according to the present invention, i.e. show the same elements substantially in the same position. For example three surfaces can be shifted, on the plane of the surface itself, by a distance of less than 0.2 mm, preferably less than, or equal to, 0.1 mm. Advantageously, said distance is less than, or equal to, the linear dimension of surface associated with a pixel (the latter as an example being equal to 0.1 mm), in the case in which the detection system includes a camera, for example an matrix camera or a linear camera. In other words, each pixel of the first image shows a micro-surface portion that is less than 0.2 mm away from the micro-surface portion shown by the pixel of the second image corresponding to each said pixel.

In other words, the three images can be substantially overlapped pixel by pixel, although the real linear surface portion associated with a single linear image does not coincide exactly for the three images, due to the rotation of the tyre that has occurred in the meantime. However, the choice of the acquisition frequency of the images and of the rotation speed is such that the three images are interlaced and thus comparable pixel by pixel. Advantageously, each pixel of the first (or second or third) image shows a micro-surface portion that differs from the micro-surface portion shown by the pixel of the second (or respectively third or first) image corresponding to each said pixel apart from the linear surface dimension associated with a pixel, as an example the spatial shift being equal to about one third of a pixel. In this way, the three images are interlaced and the acquisition of the three linear images takes place in a time period during which the tyre has rotated by a portion equal to a pixel (as an example equal to about 0.1 mm).

Once the desired rotation of the tyre has been carried out to examine the desired inner surface portion, preferably at least one complete rotation to acquire the entire circular extension, a single digital image is obtained that is made with all of the digital images of the sequence of linear portions each illuminated with a respective light source. The processing unit receives such an image from the detection system and extracts the corresponding first linear image, second linear image and third linear image of the entire desired surface portion therefrom.

In the case in which a single image is acquired as described above formed from a portion with diffused light [A], a portion with grazing light dx [B] and a portion with grazing sx [C], a succession repeated until the entire tyre is acquired, an overall image is obtained formed by the sequence ABCABCABCABCABCABCABCAB-CABC . . . . In processing this image is divided into three effective images, obtaining AAAAAAAA . . . BBBBBB-BB . . . CCCCCCCC . . . . Preferably, the processing unit 180 is also configured for the following functions: receiving the images acquired from the second linear camera 105b; and processing the images in order to check the surface portion. The processing unit 180 comprises for example a PC or a server. Preferably, the processing unit 180 is adapted for processing the second image and third image to be processed obtained with grazing light by comparing them in order to obtain information on an altimetric profile of the surface portion. Preferably, the comparison between the second image and the third image to be processed comprises calculating a difference image in which each pixel is associated with a value representative of the difference between the values associated with the corresponding pixels in the second image and in the third image to be processed.

Preferably, before comparing the second image and the third image to be processed, both in grazing light, it is foreseen to equalise the second image and the third image to be processed, for example equalising the average luminosity thereof globally or locally.

Preferably, the processing unit 180 processes the first image to be processed in diffused light to detect the possible presence of defects on the surface portion, using the information obtained by the aforementioned comparison between the second image and the third image to be processed.

Preferably, the processing unit 180 is configured to calculate the difference between the second and the third image in grazing light in order to obtain information on an altimetric profile (e.g. possible presence or absence of projections and/or depressions) of the linear surface portion.

Preferably, calculating the difference between the second image and the third image comprises calculating a difference image in which each pixel is associated with a value representative of the difference between the values associated with the corresponding pixels in the second image and in the third image. In this way it is possible to use the image obtained from the difference between the second image and the third image to highlight the three-dimensional elements (such as the raised pitting on the inner surface of the tyre or the raised writing) and take into account such information in the processing of the image in diffused light to look for defects. Optionally, a further portion of the surface of the tyre is selected, preferably but not necessarily always belonging to the outer wall 204 of the outer surface thereof, but distinct—at least partially—from the first portion. As can be seen in FIG. 3, from the shoulder 205 that has previously been selected as position where to carry out the deformation in FIG. 2, in FIG. 3 an outer surface portion of the sidewall 207 of the tyre was selected. The deformation system 130 can thus be positioned, preferably again through the processing unit 180, at the outer portion of sidewall of the tyre 200, so as to deform a second surface portion of the tyre, as depicted in FIG. 3. In this way, a new measurement can be carried out, bringing the first device 10a towards the tyre 200 so as to obtain an illumination of the further deformed outer surface portion of the tyre, preferably corresponding to an outer surface portion of the shoulder 205 of the tyre, and bringing the second device 10b towards the tyre 200 so as to illuminate a deformed inner surface portion, preferably corresponding to the sidewall 207. See for example the difference between the position of the deformation element 130 in FIG. 2 and in FIG. 3 and the consequent different position of the devices 10a, 10b in the two figures: in FIG. 2 the first light source 110 illuminates a radially central outer surface portion or sidewall 207 of the outer wall 204 of the tyre, whereas in FIG. 3 the first light source 110 illuminates an outer surface portion of the shoulder area 205 of the tyre 200. Furthermore, in FIG. 2 the second light source 108 and the third light source 109 illuminate an inner surface portion of the shoulder 205, whereas in FIG. 3 the second light source 108 and the third light source 109 illuminate an inner surface portion corresponding to the sidewall 207. Moreover, in FIG. 2, the rotation axis 119 of the thrusting roller, positioned at the shoulder 205, is inclined with respect to the plane defined by the support of the tyre 200, whereas in FIG. 3 the rotation axis 119 of the thrusting roller is substantially perpendicular to the rotation axis 201 of the tyre 200.

In the operative step illustrated in FIG. 3, the acquisition of the images through the first camera 105a and the second camera 105b of the further outer and inner deformed surface takes place in an analogous manner to what is described for FIG. 2.

A correct illumination that depends on the defect sought and on the inner or outer position of the defect itself is even more relevant, in addition to what is detailed above, since during the illuminations and corresponding acquisitions of images through the cameras described above, whereas the outer deformed surface and the inner deformed surface, respectively, are illuminated, there is a relative rotation between the tyre and three devices: the deformation system, the first light source and the second light source with associated cameras. The relative rotation of the tyre around a rotation axis thereof advantageously allows a rapid check of an entire annular portion of the tyre in quick time. However, this further reduction of the time due to the relative rotation, preferably at a relatively high speed, means that the images acquired by the cameras are acquired at a high frequency and therefore the exposure time is very low. In a short exposure time the type of illumination provided is thus very important to obtain digital images of quality such as to be able to be useful for identifying the defects in a subsequent processing.

The invention claimed is:

1. An apparatus for checking a tyre, the apparatus comprising:
   a support for receiving said tyre resting thereupon;
   a deformation system configured to deform a portion of outer surface of said tyre so as to form an elastically deformed portion of inner surface and an elastically deformed portion of outer surface on said tyre through physical contact;
   a first light source for emitting a first light radiation to illuminate said elastically deformed portion of outer surface with diffused light radiation;
   a first camera for detecting a first image of said illuminated deformed portion of outer surface and for generating at least one control signal representative of said first detected image, and a first control unit driving said first light source and said first camera;
   a second light source for emitting a second light radiation to illuminate said elastically deformed portion of inner surface with grazing light radiation;
   a second camera for detecting at least one second image of said illuminated deformed portion of inner surface and for generating at least one control signal representative of said at least one second detected image, and a second control unit driving said second light source and said second camera;
   a moving member for setting said support in relative rotation with respect to said first light source, said second light source and said deformation system around a rotation axis of the tyre; and
   a processing unit configured so that while said first light source and said second light source illuminate said deformed portion of outer surface and said deformed portion of inner surface, said deformation system acts and said moving member imparts said relative rotation.

2. The apparatus according to claim 1, wherein said second camera defines an optical plane and said second light source includes i) a first sub-source adapted for emitting a light radiation to illuminate said deformed portion of inner surface with grazing light radiation and ii) a second sub-source for emitting a light radiation to illuminate said deformed portion of inner surface with grazing light radiation, said first sub-source and said second sub-source being arranged on opposite half-planes with respect to said optical plane.

3. The apparatus according to claim 2, wherein said first sub-source and said second sub-source are arranged symmetrically with respect to said optical plane.

4. The apparatus according to claim 1, including a third light source for emitting a third light radiation, to illuminate said deformed portion of inner surface with diffused light radiation.

5. The apparatus according to claim 4, wherein said second camera defines an optical plane and said third light source is arranged symmetrically with respect to said optical plane.

6. The apparatus according to claim 1, wherein said first control unit and second control unit are configured to drive said first light source and at least one among said first sub-source, said second sub-source and said third light source, so that illumination of said elastically deformed portion of outer surface and of said elastically deformed portion of inner surface takes place simultaneously.

7. The apparatus according to claim 1, including
a first arm for moving said first light source and said first camera, and
a second arm for moving said second light source and said second camera.

8. The apparatus according to claim 1, wherein said first light source is integral with said first camera.

9. The apparatus according to claim 4, wherein said second light source and said third light source are integral with said second camera.

10. The apparatus according to claim 1, wherein said first camera and said second camera are linear cameras.

11. The apparatus according to claim 1, wherein said second camera defines an optical plane and wherein said apparatus includes a reflective element defining a reflective plane arranged perpendicular to said optical plane.

12. The apparatus according to claim 11, wherein said reflective element is arranged symmetrically to said optical plane.

13. The apparatus according to claim 11, wherein a minimum distance between said reflective plane and a focusing plane of said second camera passing at least partially through said deformed portion of inner surface is smaller than a minimum distance between said second light source and said focusing plane.

14. The apparatus according to claim 1, wherein said processing unit, first control unit and second control unit are configured to drive:
said deformation system to form an elastically deformed portion on a part of an outer surface of a shoulder of said tyre;
said first light source to illuminate a deformed portion of outer surface of a sidewall of said tyre with diffused light radiation, whereas said deformation system acts on said outer surface of said shoulder and said moving member imparts said relative rotation; and
said second light source to illuminate a deformed portion of inner surface of said shoulder of said tyre with grazing light radiation, whereas said deformation system acts on said outer surface of said shoulder and said moving member imparts said relative rotation.

15. The apparatus according to claim 1, wherein said processing unit, first control unit and second control unit are configured to drive:
said deformation system to form an elastically deformed portion on a part of an outer surface of a sidewall of said tyre;
said first light source to illuminate a deformed portion of outer surface of a shoulder of said tyre with diffused light radiation, whereas said deformation system acts on said outer surface of said sidewall and said moving member imparts said relative rotation; and
said second light source to illuminate a deformed portion of inner surface of said sidewall of said tyre with grazing light radiation whereas said deformation system acts on said outer surface of said sidewall and said moving member imparts said relative rotation.

16. The apparatus according to claim 1, wherein said deformation system includes a thrusting roller.

17. The apparatus according to claim 16, wherein the thrusting roller is freely rotatable about its own axis.

18. The apparatus according to claim 16, wherein said rotation axis of said thrusting roller can be positioned at a predetermined angle with a rotation axis of said tyre.

19. The apparatus according to claim 16, wherein said thrusting roller includes a portion with increased section at a central portion along said rotation axis and a portion with reduced section at an end thereof along said rotation axis.

20. The apparatus according to claim 1, wherein said moving member is for setting said support in relative rotation with respect to said first light source, said second light source and said deformation system around a rotation axis of the tyre for a rotation of at least 360° around said rotation axis of the tyre.

* * * * *